US012694522B2

(12) United States Patent
Lo et al.

(10) Patent No.: US 12,694,522 B2
(45) Date of Patent: Jul. 28, 2026

(54) SYSTEMS AND METHODS OF CORRECTING BATCH EFFECT IN BIOLOGICAL IMAGES

(71) Applicant: The University of Hong Kong, Hong Kong (HK)

(72) Inventors: Chi Kiu Michelle Lo, Hong Kong (HK); Man Dik Dickson Siu, Hong Kong (HK); Kin Man Kevin Tsia, Hong Kong (HK)

(73) Assignee: The University of Hong Kong, Hong Kong (HK)

( * ) Notice: Subject to any disclaimer, the term of this patent is extended or adjusted under 35 U.S.C. 154(b) by 336 days.

(21) Appl. No.: 18/463,321

(22) Filed: Sep. 8, 2023

(65) Prior Publication Data
US 2024/0104730 A1     Mar. 28, 2024

Related U.S. Application Data

(60) Provisional application No. 63/410,291, filed on Sep. 27, 2022.

(51) Int. Cl.
*G06T 7/00* (2017.01)
*G06T 5/77* (2024.01)
*G06V 20/69* (2022.01)

(52) U.S. Cl.
CPC .............. *G06T 7/0012* (2013.01); *G06T 5/77* (2024.01); *G06V 20/698* (2022.01); *G06T 2207/20084* (2013.01)

(58) Field of Classification Search
CPC .......... G06T 7/00; G06T 7/0012; G06T 5/77; G06T 2207/20084; G06T 2207/10056;
(Continued)

(56) References Cited

U.S. PATENT DOCUMENTS 11,164,312 B2 * 11/2021 Saltz ................... G06V 10/267
11,501,429 B2 * 11/2022 Stamatoyannopoulos ..................
                                                    G16B 20/00
(Continued)

FOREIGN PATENT DOCUMENTS

AU        2016211333 A1 *  8/2017  ............. G06N 3/084
CA          3066775 A1 *  4/2019  ............. G16H 70/60
(Continued)

OTHER PUBLICATIONS

Witmer, Adam, and Bir Bhanu. "Generative adversarial networks for morphological-temporal classification of stem cell images." Sensors 22.1 (2021): 206. (Year: 2021).*
(Continued)

*Primary Examiner* — Stephen R Koziol
*Assistant Examiner* — Benedict E Lee
(74) *Attorney, Agent, or Firm* — IDEA Intellectual Limited; Sam T. Yip

(57) ABSTRACT

A system for the rectification of batch-induced distortions and the extraction of phenotypic attributes from biological images is presented. This system encompasses a deep-learning generative adversarial network model, expertly tailored to converse with and modify the contrast of input images, resulting in the creation of output images. A discriminator, operating as a feedback mechanism, discriminates the output image against the input image, ensuring precise image contrast conversion. Integral to this system is a morphology distillator, having a dual classifier framework comprising a batch classifier and a cell type/state classifier. This distillator adeptly identifies phenotypic characteristics and batch-related disparities, subsequently eradicating these batch variations from the output image. The resultant augmentation enriches the cellular information within the image.

10 Claims, 33 Drawing Sheets

(58) Field of Classification Search
CPC .......... G06T 2207/30024; G06V 20/69; G06V 20/698; G06V 2201/03; G06V 10/82

See application file for complete search history.

(56) References Cited

U.S. PATENT DOCUMENTS

| | | | |
|---|---|---|---|
| 11,908,548 B2 * | 2/2024 | Dutta | G06F 16/58 |
| 12,175,670 B2 * | 12/2024 | Courtiol | G06V 10/764 |
| 2015/0110381 A1 * | 4/2015 | Parvin | G06V 20/698 |
| | | | 382/133 |
| 2017/0372193 A1 | 12/2017 | Mailhe et al. | |
| 2019/0287761 A1 | 9/2019 | Schoenmakers et al. | |
| 2021/0097686 A1 * | 4/2021 | Takeuchi | G06V 10/774 |
| 2021/0264214 A1 | 8/2021 | Ozcan et al. | |
| 2023/0059717 A1 | 2/2023 | Madabhushi et al. | |

FOREIGN PATENT DOCUMENTS

| | | | | |
|---|---|---|---|---|
| CA | 3104851 A1 * | 11/2020 | ....... | G06F 18/24133 |
| CN | 115115803 A * | 9/2022 | ............. | G06V 10/82 |
| WO | WO-2019018693 A2 * | 1/2019 | ............. | G16B 40/30 |
| WO | WO-2020216324 A1 * | 10/2020 | ............. | G06N 3/045 |
| WO | WO-2021198112 A1 * | 10/2021 | ........... | G06T 7/0012 |
| WO | WO-2021237117 A1 * | 11/2021 | ............. | G16B 20/00 |
| WO | WO-2022076654 A1 * | 4/2022 | ............. | G06N 3/047 |

OTHER PUBLICATIONS

Min, Seonwoo, Byunghan Lee, and Sungroh Yoon. "Deep learning in bioinformatics." Briefings in bioinformatics 18.5 (2017): 851-869. (Year: 2017).*

Uhler, Caroline, and G. V. Shivashankar. "Machine learning approaches to single-cell data integration and translation." Proceedings of the IEEE 110.5 (2022): 557-576. (Year: 2022).*

Tran, Hoa Thi Nhu, et al. "A benchmark of batch-effect correction methods for single-cell RNA sequencing data." Genome biology 21.1 (2020): 1-32.

Isola, Phillip, et al. "Image-to-image translation with conditional adversarial networks." Proceedings of the IEEE conference on computer vision and pattern recognition. 2017, 5967-5976.

Johnson, W. Evan, Cheng Li, and Ariel Rabinovic. "Adjusting batch effects in microarray expression data using empirical Bayes methods." Biostatistics 8.1 (2007): 118-127.

Haghverdi, Laleh, et al. "Batch effects in single-cell RNA-sequencing data are corrected by matching mutual nearest neighbors." Nature biotechnology 36.5 (2018): 421-427.

Korsunsky, Ilya, et al. "Fast, sensitive and accurate integration of single-cell data with Harmony." Nature methods 16.12 (2019): 1289-1296.

Lotfollahi, Mohammad, F. Alexander Wolf, and Fabian J. Theis. "Generative modeling and latent space arithmetics predict single-cell perturbation response across cell types, studies and species." bioRxiv (2018): 478503.

Leek, Jeffrey T., et al. "Tackling the widespread and critical impact of batch effects in high-throughput data." Nature Reviews Genetics 11.10 (2010): 733-739.

Goh, Wilson Wen Bin, Wei Wang, and Limsoon Wong. "Why batch effects matter in omics data, and how to avoid them." Trends in biotechnology 35.6 (2017): 498-507.

Ziegler, Slava, Sonja Sievers, and Herbert Waldmann. "Morphological profiling of small molecules." Cell Chemical Biology 28.3 (2021): 300-319.

Lawson, Michael, and Johan Elf. "Imaging-based screens of pool-synthesized cell libraries." Nature Methods 18.4 (2021): 358-365.

Phillip, Jude M., et al. "A robust unsupervised machine-learning method to quantify the morphological heterogeneity of cells and nuclei." Nature protocols 16.2 (2021): 754-774.

Caicedo, Juan C., et al. "Data-analysis strategies for image-based cell profiling." Nature methods 14.9 (2017): 849-863.

Mullard, Asher. "Machine learning brings cell imaging promises into focus." Nature Reviews Drug Discovery 18.9 (2019): 653-656.

Rohban, Mohammad Hossein, et al. "Systematic morphological profiling of human gene and allele function via Cell Painting." Elife 6 (2017).

Wu, Pei-Hsun, et al. "Single-cell morphology encodes metastatic potential." Science Advances 6.4 (2020): eaaw6938.

Wesley Wei Qian et al., "Batch equalization with a generative adversarial network," Bioinformatics, 2020, 36(26), 1875-1883.

Haochen Yan et al., "Virtual optofluidic time-stretch quantitative phase imaging," APL Photonics, 2020, 5, 046103.

Dahye Kim et al., "Unsupervised feature elimination via generative adversarial networks: application to hair removal in melanoma classification," IEEE Access, 2021, 9, 42610-42620.

* cited by examiner

No CytoMAD

| True Class | SCLC1 | LUAD1 | LUSC1 | SCLC2 | LUAD2 | LUSC2 | LUAD3 |
|---|---|---|---|---|---|---|---|
| SCLC1 | 0.24 | 0.54 | 0.08 | 0.01 | 0.07 | 0.05 | 0.01 |
| LUAD1 | 0.39 |  | 0.01 | 0.02 | 0.04 | 0.02 | 0.02 |
| LUSC1 | 0.25 | 0.33 | 0.20 | 0.01 | 0.01 | 0.08 | 0.09 |
| SCLC2 | 0.16 | 0.45 | 0.16 | 0.01 | 0.05 | 0.15 | 0.01 |
| LUAD2 | 0.19 | 0.37 | 0.03 | 0.01 | 0.31 | 0.06 | 0.03 |
| LUSC2 | 0.23 | 0.04 | 0.03 | 0.13 | 0.08 | 0.35 | 0.14 |
| LUAD3 | 0.11 | 0.06 | 0.07 | 0.05 | 0.30 | 0.30 | 0.12 |

Predicted Class

CytoMAD

| True Class | SCLC1 | LUAD1 | LUSC1 | SCLC2 | LUAD2 | LUSC2 | LUAD3 |
|---|---|---|---|---|---|---|---|
| SCLC1 |  | 0.10 | 0.03 | 0.02 | 0.10 | 0.01 | 0.01 |
| LUAD1 | 0.08 |  | 0.07 | 0.02 | 0.01 | 0.01 | 0.02 |
| LUSC1 | 0.01 | 0.24 |  | 0.01 | 0.00 | 0.02 | 0.00 |
| SCLC2 | 0.00 | 0.01 | 0.00 |  | 0.02 | 0.12 | 0.02 |
| LUAD2 | 0.12 | 0.01 | 0.00 | 0.08 |  | 0.01 | 0.00 |
| LUSC2 | 0.01 | 0.01 | 0.01 | 0.19 | 0.01 |  | 0.00 |
| LUAD3 | 0.00 | 0.04 | 0.00 | 0.07 | 0.00 | 0.00 |  |

Predicted Class

FIG. 2C

Dry Mass
(*pg*)

Amplitude Var
(*norm. int.²*)

QP Entropy Mean
(*arb. unit*)

QP Fiber Mean
(*arb. unit*)

Across major lung cancer types

Across lung adenocarcinoma subtypes

No CytoMAD

Predicted Class

| | | H69 | H358 | H520 | H526 | H1975 | H2170 | HCC827 |
|---|---|---|---|---|---|---|---|---|
| Image-based | H69 | 0.30 | 0.09 | 0.02 | 0.05 | 0.20 | 0.29 | 0.05 |
| | H358 | 0.35 | 0.11 | 0.08 | 0.15 | 0.09 | 0.20 | 0.02 |
| | H520 | 0.06 | 0.22 | 0.03 | 0.18 | 0.01 | 0.30 | 0.20 |
| | H526 | 0.00 | 0.01 | 0.00 | | 0.39 | 0.00 | 0.01 |
| | H1975 | 0.08 | 0.01 | 0.00 | | 0.24 | 0.02 | 0.03 |
| | H2170 | 0.09 | 0.09 | 0.11 | 0.10 | 0.02 | | 0.04 |
| | HCC827 | 0.09 | 0.00 | 0.04 | 0.16 | 0.06 | 0.13 | |

CytoMAD

Predicted Class

| | | H69 | H358 | H520 | H526 | H1975 | H2170 | HCC827 |
|---|---|---|---|---|---|---|---|---|
| True Class | H69 | | 0.01 | 0.01 | 0.14 | 0.01 | 0.00 | 0.00 |
| | H358 | 0.02 | | 0.01 | 0.11 | 0.05 | 0.05 | 0.07 |
| | H520 | 0.00 | 0.01 | | 0.00 | 0.02 | 0.12 | 0.07 |
| | H526 | 0.27 | 0.06 | 0.00 | | 0.08 | 0.00 | 0.01 |
| | H1975 | 0.01 | 0.00 | 0.01 | 0.03 | | 0.01 | 0.00 |
| | H2170 | 0.00 | 0.01 | 0.03 | 0.00 | 0.02 | | 0.06 |
| | HCC827 | 0.02 | 0.09 | 0.05 | 0.01 | 0.01 | 0.07 | |

FIG. 3

With CytoMAD

|        | SSIM   | RMSE   |
|--------|--------|--------|
| Tumor  | 0.9100 | 0.0067 |
| Normal | 0.8769 | 0.0126 |
| Blood  | 0.8774 | 0.0060 |

SYSTEMS AND METHODS OF CORRECTING BATCH EFFECT IN BIOLOGICAL IMAGES

CROSS-REFERENCE TO RELATED APPLICATIONS

The present application claims priority from U.S. provisional patent application Ser. No. 63/410,291 filed Sep. 27, 2022, and the disclosure of which is incorporated herein by reference in its entirety.

FIELD OF THE INVENTION

The present invention generally relates to the field of biological images. More specifically the present invention relates to systems and method for correcting a batch effect in biological images.

BACKGROUND OF THE INVENTION

In the realm of cell-based and tissue-based bioassays, contemporary technologies have ushered in an era of high-throughput and high-content analysis, allowing for the meticulous measurement of numerous biological processes with a precision that extends down to the single-cell level. These advanced methodologies have become integral tools in pharmaceutical industries for drug discovery and screening, as well as in life science laboratories engaged in fundamental biomedical and biological research. The fundamental principle underlying these high-throughput/high-content bioassays is to achieve comprehensive profiling of diverse phenotypes within a substantial array of specimens, all under a multitude of distinct conditions and perturbations.

One noteworthy advancement is the emergence of label-free single-cell imaging technologies, which have underscored the relevance of biophysical cytometry in unraveling the intricacies of functional cellular heterogeneity within intricate biological systems. With the continuous enhancement of throughput and content, systematic profiling of biophysical cell morphology has become a reality, enabling the exploration of subtle disparities in cell mass, shape, size, and biophysical/mechanical attributes across varying cell types or states, as well as in response to diverse chemical and genetic interventions. The implementation of these imaging technologies is gaining momentum in both pharmaceutical industries and life science laboratories, furnishing vital mechanistic insights that may be concealed in conventional molecular assays.

Yet, a significant hurdle looms over these advancements: the pervasive impact of non-biological artifacts stemming from variability in technical parameters among different experimental batches. This phenomenon, known as "batch effect", poses a formidable challenge to the effectiveness of high-throughput/high-content assays. Rectifying and mitigating batch effects is not merely a technicality; it is imperative for enhancing data reproducibility, preventing misinterpretation, and averting erroneous conclusions during subsequent analyses (Leek et al. Nature Reviews Genetics, 2010).

In the context of biological image processing, batch effects refer to systematic variations or discrepancies in the data that arise from technical factors rather than the biological variables of interest. These technical factors may relate to variations in equipment, reagents, sample preparation, or imaging conditions. Batch effects can introduce noise and bias into the data, making it difficult to distinguish true biological signals from artifacts. Removing batch effects is a critical step in analyzing biological image data, as it helps to ensure that the observed differences or patterns are genuinely related to the biological phenomena under investigation and not the result of technical variations.

The significance of batch-effect correction becomes even more pronounced when amalgamating data from diverse assay modalities for comprehensive analysis. An exemplar of this is the burgeoning trend in multi-omics analysis (Goh et al., Trends in Biotechnology, 2017), encompassing integrative single-cell analysis derived from disparate single-cell technologies. Notably, several algorithms have been devised to address batch effects in sequencing and proteomics experiments (such as ATAC-seq, RNA-seq), leveraging machine learning approaches to attenuate batch effects through data distribution mapping (Haghverdi et al., Nature Biotechnology, 2018) (Korsunsky et al., Nature Methods, 2019). Nonetheless, these methodologies often necessitate a common subset of cells for training, making them less applicable to real-world scenarios where a broader range of batches are involved.

Furthermore, while these methods have seen success in batch-effect correction within the same omics modality or across distinct modalities sharing similar data structures, such as various sequencing measurements, their application to image-based cellular and tissue analysis remains conspicuously limited. While batch normalization has emerged as a prevalent approach for image-based batch correction, current methods, including those rooted in machine learning, encounter constraints that hinder their efficacy in addressing batch effects. Some require prior knowledge or assumptions about statistical distributions within each batch, while others mandate the presence of a common control sample across all batches for normalization. The complexities intrinsic to 2D (or even 3D) biological image data structures, along with the profound diversity and intricacy of these data, restrict the applicability of existing methods in image-based analyses.

It is noteworthy that recent work has demonstrated the close influence of genetic and chemical perturbations on image-based cell phenotypes (Ziegler et al., Cell Chemical Biology, 2021) (Lawson et al., Nature Methods, 2021), paving the way for the establishment of a morphological "fingerprint (profile)" that underpins cellular functions (Philip et al., Nature Protocols, 2021) (Caicedo et al., Nature Methods, 2017). This morphological profiling, bolstered by deep-learning-based computer vision, holds great promise in various applications, spanning from drug discovery (emerging biotechnology companies e.g. Recursion, insitro (Mullard et al., Nature Reviews Drug Discovery, 2019)) and basic biology research to clinical diagnosis (Rohban et al., Elife 6, 2017) (Wu et al., Science Advances, 2020).

Despite these advances, the challenges of batch-effect correction in image-based assays persist. Current solutions, effective within their respective modalities, often require prior knowledge and struggle with the drastic divergence between image data and sequencing data. Unlike sequencing data, which assumes a 1D vector per entry, biological images encapsulate 2D or 3D snapshots, encoded with diverse image contrasts and intricate spatiotemporal correlations. Consequently, disentangling batch effects from biological image datasets proves considerably more intricate than with conventional omics data.

Therefore, it is clearly that the art is constantly looking for an efficient and effective approach to remove and correct batch effect in biological images, and the present invention addresses this need.

SUMMARY OF THE INVENTION

It is an objective of the present invention to provide systems or methods to solve the aforementioned technical problems.

In accordance with a first aspect of the present invention, a system for correcting batch effects by removing systematic variations in biological images from equipment, reagents, sample preparation, or imaging conditions and extracting phenotypic features in biological images is provided. The system includes:

a deep-learning generative adversarial network model trained to determine an underlying structure of an input image and remove image artifacts, in which the deep-learning generative adversarial network model includes an autoencoder architecture for extracting morphological features (including but not limited to biophysical features) of the input image, reconstructing an output image and pretraining the components;

a discriminator that classifies the output image by comparing it with the input image, serving as part of the concurrent refinement cycle to achieve accurate image reconstruction and contrast conversion; and a morphology distillator including a batch classifier and a cell type/state classifier for recognizing phenotypic features and batch variations and removing the batch variations in the output image through a feedback mechanism in the concurrent refinement cycle.

In accordance with one embodiment of the present invention, the deep-learning generative adversarial network model is pretrained as the autoencoder architecture for image reconstruction.

In accordance with one embodiment of the present invention, the batch classifier and the cell type/state classifier are pretrained by the above autoencoder to identify batch and cell information.

In accordance with one embodiment of the present invention, the deep-learning generative adversarial network mode is retrained by the concurrent refinement cycle with the discriminator and the morphology distillator with frozen models' parameters for batch effect correction.

In accordance with one embodiment of the present invention, the deep-learning generative adversarial network model can be optionally pretrained with an image contrast translation functionality, so as to perform an image contrast conversion for providing an augmented output image.

In accordance with one embodiment of the present invention, the morphology distillator is integrated into a bottleneck region and the output layer of the deep-learning generative adversarial network model, establishing a feedback loop to separate the phenotypic features and batch variations.

In accordance with another embodiment of the present invention, the cell type/state classifiers within the morphology distillator employ a self-supervised learning mechanism to capture and distinguish cellular phenotypes to provide automated cellular classification.

In accordance with one embodiment of the present invention, the batch distillation potency of the deep-learning generative adversarial network model can be elevated by a process of segmenting the batch classifier within the morphology distillator at a bottleneck stage into multiple miniature classifiers, and/or a process of periodic retraining at a predetermined interval (e.g., every 10 epochs).

In accordance with one embodiment of the present invention, the discriminator employs a convolutional neural network to assess and guide the contrast adjustment process for translation of image contrast.

In accordance with one embodiment of the present invention, the morphology distillator incorporates a self-attention mechanism to selectively focus on informative regions within the input image, to extract phenotypic features from the input image.

In accordance with one embodiment of the present invention, the training to determine an underlying structure of an input image and remove image artifacts includes training on diverse and heterogeneous biological datasets to learn different imaging modalities, cell types, and experimental conditions.

In accordance with one embodiment of the present invention, the system is implemented in a cloud-based platform for remote access to batch correction and phenotypic feature extraction.

In accordance with a second aspect of the present invention, a method for correcting batch effects and extracting phenotypic features in biological images is provided. The method includes the steps of:

inputting a biological image into a deep-learning generative adversarial network model for generating an output image;

utilizing a morphology distillator to remove batch variations and recognize phenotypic features within the output image; and generating a biological image with batch-distilled phenotypic features.

In accordance with one embodiment of the present invention, the deep-learning generative adversarial network model converses and adjusts the contrast of the biological image in order to augment cellular information.

In accordance with another embodiment of the present invention, the deep-learning generative adversarial network model transforms a bright-field image to a quantitative phase image.

In accordance with another embodiment of the present invention, hand-crafted hierarchical biophysical phenotypes are adopted for facilitating the interpretation of the batch-distilled phenotypic features from the deep-learning generative adversarial network model.

In accordance with one embodiment of the present invention, the deep-learning generative adversarial network model mitigates batch effects across patients with distinct biological samples of significant heterogeneity and distinct cellular characteristics, aiding the model in disentangling valuable biological information from batch-related distortions.

In accordance with one embodiment of the present invention, the morphology distillator has a batch classifier and a cell type/state classifier, and the batch classifier and the cell type/state classifier disentangle the batch variations from biological information.

In accordance with one embodiment of the present invention, the morphology distillator uses unsupervised learning to disentangle and suppress batch-specific variations.

In accordance with one embodiment of the present invention, the method further includes a step of conducting downstream analysis using the biological image with corrected batch effects and extracted phenotypic features, wherein the downstream analysis may be cell population studies, disease characterization, drug response assessment, and biomarker discovery.

In accordance with one embodiment of the present invention, the batch classifier within the morphology distillator employs domain adaptation to mitigate the influence of batch effects while retaining biologically significant cellular information.

In accordance with one embodiment of the present invention, the biological image with batch-distilled phenotypic features predicts cellular responses to different experimental conditions and interventions.

BRIEF DESCRIPTION OF THE DRAWINGS

Embodiments of the invention are described in more details hereinafter with reference to the drawings, in which:

FIG. 1B shows the design of CytoMAD;

FIGS. 2A-2H depict the batch distillation performance with CytoMAD on lung cancer cell lines dataset, in which FIG. 2A shows the lung cancer cell lines images from multiplexed asymmetric-detection time-stretch optical microscopy (multi-ATOM) and CytoMAD results, FIG. 2B depicts the violin plots on SSIM and RMSE distributions, FIG. 2C shows the confusion matrix on lung cancer cell types classification with CytoMAD phenotypic features, FIG. 2D illustrates the UMAP across major lung cancer types, FIG. 2E shows the UMAP across lung adenocarcinoma subtypes, FIG. 2F depicts the absolute correlation profile of selected CytoMAD features group, FIG. 2G exhibits the violin plots across major lung cancer types, and FIG. 2H demonstrates the violin plots across lung adenocarcinoma subtypes;

FIG. 3 shows the confusion matrix on lung cancer cell types classification with CytoMAD QPI;

FIGS. 4A-4B depict the correlation between CytoMAD profiles and biophysical phenotypes, in which FIG. 4A is a correlation map between CytoMAD features and biophysical phenotypes, where the correlation values are normalized along each CytoMAD feature, and FIG. 4B shows the absolute correlation profile of each CytoMAD features group;

FIGS. 6A-6E depict the drug treatment analyses with CytoMAD batch distillation, in which FIG. 6A shows the H2170 drug response images from multi-ATOM and CytoMAD results, reporting the multi-ATOM label-free images of BF and QPI, and the CytoMAD batch-distill QPI images of the H2170 drug treatment response, FIG. 6B shows the UMAP across DMSO negative control samples and across IC50 samples, FIG. 6C depicts the confusion matrix on IC50 samples with phenotypic features, FIG. 6D shows the batch distance on biophysical phenotypes along drug concentration, FIG. 6E depicts the violin plots of biophysical phenotypes across IC50 samples;

FIGS. 12A-12D shows the pilot study results on NSCLC with CytoMAD, in which FIG. 12A shows the NSCLC experimental pipeline with CytoMAD, FIG. 12B demonstrates the UMAP on tumor and normal lung tissue samples, FIG. 12C shows the molecular marker analysis of tumor and normal lung tissue samples, and FIG. 12D depicts the subpopulation analysis in EMP cells;

FIG. 14B shows the SSIM and RMSE of different clinical samples;

FIGS. 16A-16B depict the UMAP on molecular markers of tumor and normal lung tissue samples, in which FIG. 16A shows that the UMAP analysis is conducted based on patients' tumors and normal lung tissue sample and FIG. 16B shows the UMAP of each patient;

DETAILED DESCRIPTION

Figure 1A:
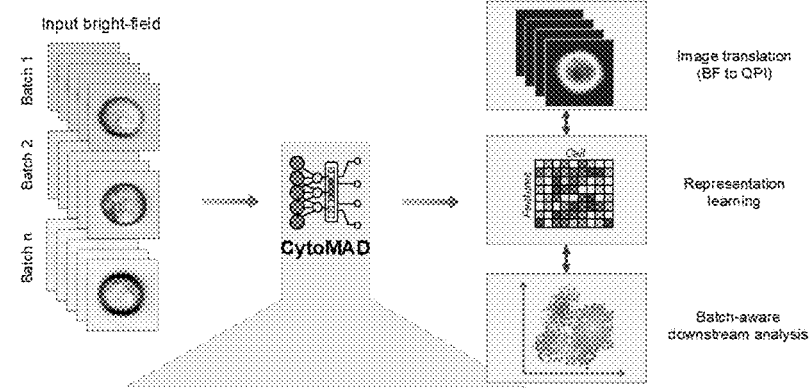
FIGS. 1A-1B depict a flowchart and architecture of CytoMAD in accordance with one embodiment of the present invention, in which FIG. 1A relates to the flowchart

In the following description, systems and/or methods of correcting batch effects and extracting phenotypic features in biological images and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention provides a system addressing a critical challenge in biological image analysis, the correction of batch effects and the extraction of phenotypic features. These systematic variations, often arising from differences in equipment, reagents, sample preparation, or imaging conditions, can significantly impact the accuracy and reliability of image-based analyses. The present system combines the deep learning techniques with advanced image processing methodologies to tackle this issue and enhance the extraction of meaningful phenotypic information from biological images.

At the core of this system is a deep-learning generative adversarial network model, which is meticulously trained to uncover the intrinsic structure of input biological images. The model not only identifies and removes image artifacts resulting from batch-related variations but also performs image contrast conversion. The result is an output image that has undergone meticulous batch effect correction, achieving accurate and reliable image contrast conversion through an iterative feedback process.

Key to the system's effectiveness is the discriminator, an essential component in the concurrent refinement cycle. By comparing the output image with the original input, the discriminator achieves precise image contrast conversion. It identifies and rectifies any residual batch-related variations, ensuring the fidelity of the corrected image and contributing to more accurate downstream analyses.

Further enhancing the system's capabilities is the morphology distillator, having two critical elements: a batch classifier and a cell type/state classifier. The batch classifier adeptly recognizes and eliminates batch-specific variations detected in the output image, a crucial step in refining the image correction process. The cell type/state classifier employs a unique self-supervised learning mechanism, enabling it to automatically capture and differentiate diverse cellular phenotypes. This automated classification process significantly streamlines cell classification, removing the need for extensive manual annotations and improving efficiency.

To achieve seamless integration and optimize performance, the morphology distillator is strategically embedded within a bottleneck region and the output layer of the model. This approach, couples with the discriminator, establishes a concurrent refinement cycle that effectively segregates and manages phenotypic features and batch-related variations. This integration enhances the accuracy and effectiveness of the system, generating corrected images with refined phenotypic features that can be leveraged for various downstream analyses.

The system also possesses advanced features, such as an autoencoder architecture within the model. This architecture facilitates the extraction of intricate morphological features from input images, and enables smooth translation between different contrast modes. Moreover, the model undergoes extensive training on diverse and heterogeneous biological datasets. This comprehensive training equips the model to adapt to a wide range of imaging modalities, cell types, and experimental conditions, enhancing its versatility and utility. For instance, the deep-learning generative adversarial network model is pretrained by the autoencoder architecture for image reconstruction, the batch classifier and the cell type/state classifier are pretrained by the autoencoder architecture to identify batch and cell information, and the deep-learning generative adversarial network mode is retrained by the concurrent refinement cycle with the discriminator and the morphology distillator with frozen models' parameters for batch effect correction.

In some circumstances, the deep-learning generative adversarial network model is optionally pretrained by the autoencoder using an image contrast translation, so as to perform an image contrast conversion for providing an augmented output image.

In order to accelerate the process, the batch distillation potency of the deep-learning generative adversarial network model can be elevated by a process of segmenting the batch classifier within the morphology distillator at a bottleneck stage into multiple miniature classifiers, and/or a process of periodic retraining at a predetermined interval.

Moreover, the system's implementation extends to a cloud-based platform. This cloud-based framework allows remote access to the system's capabilities, empowering researchers and practitioners to harness its power for batch correction and phenotypic feature extraction from biological images. This capability holds promise for advancing a multitude of applications, from basic research to clinical diagnostics and drug discovery, thereby propelling the field of biological imaging towards new horizons.

In another aspect, the present invention provides a method for correcting batch effects and extracting phenotypic features from biological images.

Central to the method is a well-trained deep-learning generative adversarial network model. This model serves as the cornerstone for image correction and feature extraction, utilizing its capacity to comprehend the inherent structure of input biological images. The model goes beyond mere image contrast conversion; it employs its architecture to identify and eliminate image artifacts stemming from batch-related variations, resulting in an output image that has undergone meticulous batch effect correction.

The method employs a morphology distillator, a sophisticated component having a batch classifier and a cell type/state classifier. This dynamic duo operates harmoniously to achieve two crucial objectives: disentangling batch-specific variations and discerning phenotypic features. The batch classifier adeptly identifies and removes batch-related variations present in the output image, contributing to refined image correction. Complementing this, the cell type/state classifier also acts as a unique self-supervised learning mechanism, enabling automated recognition of diverse cellular phenotypes. This intelligent classification process obviates the need for extensive manual annotations, streamlining the cell classification process significantly.

The method integrates these components, particularly the morphology distillator, into a framework. This integration is achieved by embedding the morphology distillator within a strategic bottleneck region of the model. This design establishes a feedback loop that effectively segregates phenotypic features and batch-related variations, thereby optimizing the process and generating corrected images with enhanced phenotypic features.

A notable attribute of the method is the implementation of an autoencoder architecture within the model. This architectural enhancement facilitates the extraction of complex morphological features from input images, enabling smooth transitions between different contrast modes. Additionally, the model undergoes comprehensive training on diverse and heterogeneous biological datasets. This extensive training equips the model to adapt to an array of imaging modalities, cell types, and experimental conditions, underscoring its versatility and utility. In some embodiments, hand-crafted hierarchical biophysical phenotypes are adopted for facilitating the interpretation of the batch-distilled phenotypic features from the deep-learning generative adversarial network model.

Furthermore, the method extends its application to downstream analyses. After the batch effects are corrected and phenotypic features extracted, the resulting images nay be subjected for further exploration. The method enables a spectrum of analyses, ranging from cell population studies, disease characterization, drug response assessments, to biomarker discovery. This downstream versatility enhances the method's impact across a wide range of biological and clinical applications. For example, the deep-learning generative adversarial network model mitigates batch effects across patients with distinct biological samples of significant heterogeneity and distinct cellular characteristics, aiding the model in disentangling valuable biological information from batch-related distortions.

Moreover, the method's implementation extends to predictive modeling. The biological images enriched with batch-distilled phenotypic features hold the potential to predict cellular responses to diverse experimental conditions and interventions, providing a powerful tool for advancing our understanding of complex cellular behaviors.

In summary, the method offers a comprehensive and effective solution for batch effect correction and phenotypic feature extraction. Through the integration of advanced technologies and methodologies, it addresses the challenges posed by batch-related variations in biological images, enabling accurate and reliable downstream analyses across various applications and research domains.

The system introduces a specialized generative deep learning strategy tailored for image-based batch distillation, referred to as cyto-morphology adversarial distillation (CytoMAD). This innovative approach combines a conditional generative adversarial network (GAN) with a morphology distillator, which encompasses a set of classification networks. Together, these components enable robust conversion of image contrast and the distillation of important biological phenotypes from batches with distortion. CytoMAD delivers both batch-distilled phenotypic features and cellular images as its outputs, which can be further utilized for downstream biological analysis.

As shown in FIG. 1A, CytoMAD takes in brightfield (BF) cellular images from multiple batches as model input. It enables robust image contrast conversion and distills underlying biological phenotypes from batch distortions (representation learning), providing both the batch-distilled morphological features and QPI images as model outputs.

Figure 1B:
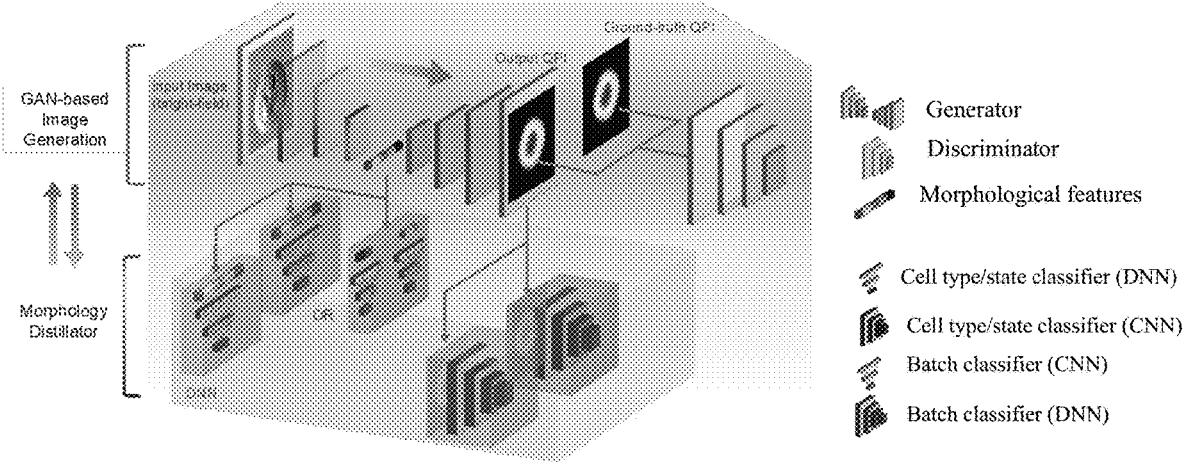

In one particular embodiment, CytoMAD concentrates on label-free imaging modalities, specifically the translation from bright-field to quantitative phase images (QPI). This emphasis stems from their increasing relevance in the realm of biology, as they reveal the biophysical and mechanical attributes of cells, which form the foundation of cellular functions-characteristics that might not always be discerned through fluorescence counterparts. As shown in FIG. 1B, the GAN-based backbone takes in BF and converts it into QPI output. The discriminator undertakes the task of classifying the CytoMAD output in comparison to the ground truth, playing a pivotal role as a feedback mechanism for achieving precise image contrast conversion. Adding to this, the morphology distillator endows CytoMAD with a self-supervised batch-aware characteristic, seamlessly integrated through a suite of classification networks. Within this construct, the classification networks encompass both batch classifiers and cell type/state classifiers, facilitating the untangling of batch variations from the core biological information. This disentanglement occurs not only at the bottleneck phenotypes, where the CytoMAD profile takes shape, but also extends to the final output images.

Distinguishing itself from previous methods of deep learning batch correction or image translation, CytoMAD has three distinct attributes: (1) a flexible capacity to model intricate, non-linear data distributions, thereby enabling correction of varied batch effects devoid of distributional assumptions; (2) precise generation of quantitative phase images (QPI) suitable for batch effect correction, achieved by learning to translate and augment images across batches while retaining biological content; (3) concurrent provision for self-supervised batch-corrected morphological profiles, instrumental for downstream analysis.

The CytoMAD model is built upon a foundation of conditional GAN and includes a generator network for image-to-image translation, as well as a discriminator classifier responsible for optimizing generator predictions through a feedback mechanism. The GAN-based backbone in CytoMAD facilitates image generation and contrast translation for augmented cellular information.

Prior to the implementation of the batch-aware module, the generative deep learning model undergoes initial pretraining for image generation and conversion. The generator processes cell images of a specific image contrast (e.g., bright-field (BF), fluorescence) as input to the model. These images traverse an encoder, passing through multiple layers of 2D convolutional layers, batch normalization layers, and mathematical activation functions. This sequence of layers condenses the biological information contained within the input images into a 1D array located at the bottleneck.

The output images are then reconstructed based on this concise 1D array, while also incorporating the capability of image contrast translation (e.g., from BF to quantitative phase image (QPI) in one embodiment). As the array progresses through multiple deconvolutional layers, batch normalization layers, and mathematical activation equations within the decoder, skip-in layers are employed between the encoder and decoder to enhance the preservation of image features. With the 1D representative cellular phenotypic features (i.e., no-CytoMAD-profile) and the output images (i.e., no-CytoMAD-images) from the pretrained model without batch-aware module, they will serve as inputs for training the morphology distillator in the next stage.

The discriminator network contributes to the refinement of generator image reconstruction by classifying predicted images against original target images (i.e., original QPI). This process establishes a feedback mechanism, utilizing the classification loss to fine-tune generator parameters. Through this iterative training, the CytoMAD model achieves precise image reconstruction and contrast conversion from BF to QPI. This contrast translation functionality serves as an additional feature of CytoMAD, enhancing cellular information and complementing its batch-aware characteristics. In cases where image contrast conversion is unnecessary, an alternative convolutional autoencoder architecture may be adopted by aligning the input and output target images of the model.

Moreover, CytoMAD distinguishes itself significantly from ordinary conditional GANs (cGAN) by seamlessly integrating a self-supervised morphology distillator. This pivotal component encompasses an ensemble of classification networks, encompassing both batch classifiers and cell type/state classifiers, functioning harmoniously to meticulously untangle batch-specific variations from the inherent biological information. The self-supervised essence of this model derives from the strategic utilization of image translation and batch classification as pretext tasks, facilitating the acquisition of meaningful representations without the necessity for extensive manual annotations. These classifiers are first pre-trained based on no-CytoMAD-profile and no-CytoMAD-images to identify the batch and cell-type information in the cGAN backbone. To suppress the adverse impacts of batch distortion while enhancing the intrinsic biological insights residing within phenotypic features and cellular images, these classification networks are strategically embedded at both the bottleneck region and the output of the GAN-based backbone (FIGS. 1A-1B), with frozen models' parameters, for guiding the next phase of batch correction in the generator model. By freezing the classifiers' parameters and including the morphology distillator loss into the CytoMAD loss function, we enforce the generator to recognize and remove batch information while preserve cell-type information with minimal alterations with the no-CytoMAD-profile and no-CytoMAD-images. The potency of batch distillation within CytoMAD can be further elevated by segmenting the batch classifiers at the bottleneck stage into multiple miniature classifiers, and/or a process supported by periodic retraining at predetermined intervals (e.g., every 10 epochs). The self-supervised morphology distillator meticulously shapes a symbiotic feedback loop (i.e. concurrent refinement cycle) with the GAN-driven image translation process, effectively disentangling batch-related information from the biological nuances of interest. This ultimately culminates in the attainment of batch-distilled phenotypic features and cellular images.

Furthermore, the classification networks within the morphology distillator effectively mitigate batch-to-batch variations while retaining essential biological differences. These classifiers are integrated at both the bottleneck region and the output of the generator model, and suppress batch distortion and enhance biological information within the resulting phenotypic features and cellular images.

The bottleneck region of the pretrained generator hosts the batch classifier, tasked with harmonizing batch-to-batch variations, while the cell type/state classifier preserves cellular variations within the 1D features. Operating within the framework of neural networks, these classifiers promote disentanglement between batch information and cellular phenotypes. This facilitates the batch-distillation process, uncovering valuable morphological information within both the 1D phenotypic profiles (i.e., CytoMAD-profile) and 2D cell images (i.e., CytoMAD-images).

Convolutional neural network-based batch and cell type/state classifiers are also positioned at the generator's output. These classifiers guide the reconstruction of batch-aware cell images and counteract batch information introduced by encoder-decoder skip-in layers. The implementation of multiple batch classifiers, along with periodic retraining at predetermined intervals (e.g., every 10 epochs) within the CytoMAD model, streamlines and expedites the batch elimination procedure.

During the concurrent refinement cycle of CytoMAD training, the model parameters of batch classifiers and cell-type/state classifiers within morphology distillator are frozen. They send feedback to update the generator's parameters and the discriminator's parameters in every epoch, guiding the batch-correction and ensuring the image prediction accuracy.

Overall, the classification networks contribute to the CytoMAD loss function $L_{CytoMAD}$.

$$L_{CytoMAD}=L_{GAN}+L_{cnn}+L_{nn}, \text{ where } L_{GAN}=W_{gen}L_{gen}+$$
$$W_{dis}L_{dis}, L_{cnn}=W_{Bcnn}L_{Bcnn}+W_{Ccnn}L_{Ccnn},$$
$$L_{nn}=W_{Bnn}L_{Bnn}+W_{Cnn}L_{Cnn}$$

$L_{GAN}$ is the loss of GAN-backbone model, with $W_{gen}$ and $L_{gen}$ denote the weighting and the mean square loss of generator model respectively, $W_{dis}$ and $L_{dis}$ denote the weighting and the binary cross entropy loss of discriminator model. $L_{cnn}$ is the loss of convolutional-neural-network-based classifier models, with $W_{Bcnn}$ and $L_{Bcnn}$ denote the weighting and the categorical cross entropy loss of batch classifier model, $W_{Ccnn}$ and $L_{Ccnn}$ denote the weighting and the categorical cross entropy loss of cell type classifier model. $L_{nn}$ is the loss of neural-network-based classifier models, with $W_{Bnn}$ and $L_{Bnn}$ denote the weighting and the categorical cross entropy loss of batch classifier model, $W_{Cnn}$ and $L_{Cnn}$ denote the weighting and the categorical cross entropy loss of cell type classifier model.

This forms a concurrent refinement cycle with the image translation for unraveling the batch information from the biological variations of interest, and eventually, achieving batch-aware property at both the concise 1D biophysical phenotyping (i.e., CytoMAD-profile) and the endmost reconstructed images (i.e., CytoMAD-images). Since only cell types labels and batch labels are utilized in this classifier networks, the CytoMAD serves as a weakly supervised model in disentangling batch distortion and cellular information.

Figure 17:
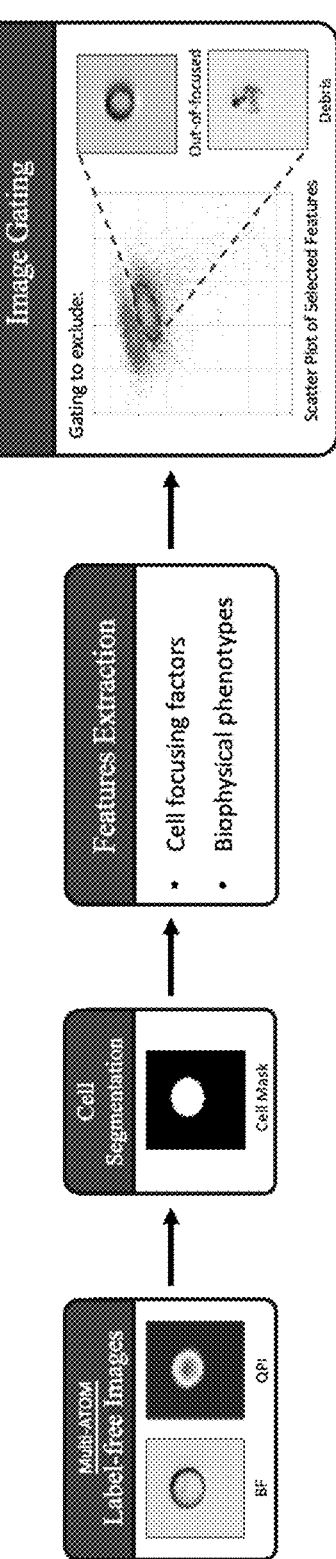
FIG. 17 shows the pre-processing pipeline of multi-ATOM images.

In one embodiment, pre-processing (FIG. 17) is required to remove undesired cell images from the collected dataset prior to CytoMAD training. Illustrated in FIG. 17, BF and QPI images from multi-ATOM undergo an initial cell segmentation step to distinguish cell bodies from the background. This yields cell masks, which are then employed to compute cell focusing factors and biophysical phenotypes for cell information quantification. Cell focusing factors encompass a set of parameters gauging the quality of image data. These parameters serve as the basis for generating 2-dimensional scatter plots, facilitating image inspection and cell gating to exclude cells that are out of focus or debris. Employing this data processing pipeline across all multi-ATOM imaging datasets ensures data quality, forming a robust foundation for subsequent comprehensive quantitative cell analysis.

Meanwhile, a comprehensive set of biophysical phenotypes that encompass cell morphological and biological properties of cells can also be derived from single-cell BF and QPI images captured by the multi-ATOM system. These 84 hand-crafted biophysical phenotypes are further organized into three hierarchical categories: bulk phenotypes (e.g., area, circularity), global phenotypes (e.g., dry mass density, attenuation density), and local phenotypes (e.g., BF entropy, phase entropy). These biophysical phenotypes could be correlated and facilitate the interpretation of batch-distilled CytoMAD-profile and CytoMAD-images.

Since the CytoMAD enables both image-to-image contrast conversion and batch-distill images generation, multiple mathematical metrics are applied to measure similarity in 2D structures and difference in values between original images and the CytoMAD images.

In the following examples, the diverse capabilities of CytoMAD in multiple applications will be demonstrated. This includes the precise and label-free classification of human lung cell types and subtypes, functional assessments of drug treatments to analyze morphological alterations in response to varying drugs and concentrations, and biophysical cellular evaluations of tumor biopsies extracted from early-stage non-small cell lung cancer (NSCLC) patients. These examples demonstrate the technical capability CytoMAD across a broad spectrum of cell biology and biomedical research scenarios.

EXAMPLES

The training and testing of deep learning model requires large datasets and high-throughput imaging flow cytometry is definitely well-suited for this purpose. With the assistance of multiplexed asymmetric-detection time-stretch optical microscopy (multi-ATOM), it enables high-dimensional biophysical phenotyping in single-cell level and provide large-scale, label-free cell images in multiple imaging contrast (e.g. BF, QPI) at an ultrahigh-throughput of >10,000 cells/sec. Therefore, multi-ATOM is employed for acquiring the following datasets, from laboratory-cultured cells to clinical patient samples, to verify the performance of CytoMAD model on batch distillation and image contrast translation (i.e. from BF to QPI).

As used herein, the term "structural similarity index measure (SSIM)" refers to a perceptual metric widely utilized to quantify the similarity between pixel structures in images. It assesses the extent to which image structure is preserved in CytoMAD-images compared to the original target images (i.e., QPI). Recognizing that valuable biological information resides within the cell region and that downstream analysis focuses on this area, SSIM values are computed and reported exclusively for the cell area. A high SSIM value, approaching 1, indicates a strong similarity between images.

As used herein, the term "root mean square error (RMSE)" is employed to calculate the pixel-to-pixel differences between the original images and the CytoMAD-images. Similarly, RMSE values are reported specifically for the cell region, ensuring a comprehensive study. A low RMSE value suggests the accurate phase value reconstruction.

As used herein, the term "uniform manifold approximation and projection (UMAP)" is utilized herein for visual inspection and dimension reduction analysis to quantify the reduction of batch distances in biophysical phenotypic profiles, thus evaluating the efficacy of the CytoMAD model in mitigating batch effects. To assess the mitigation of batch-to-batch variations, UMAP analyses are conducted on both GAN-based phenotypes (i.e., no-CytoMAD-profile) and CytoMAD-profile. This visualization technique allows observation of batch mixing across multi-batch data, facilitating the assessment of CytoMAD's efficiency in removing batch effects. Improved batch mixing post-CytoMAD implementation serves as an indicator of its effectiveness in minimizing batch differences.

In addition to visual inspection, quantitative analysis is performed to assess the efficiency of batch effect removal. This is achieved by measuring the reduction in batch distance values within biophysical phenotypic profiles. By leveraging CytoMAD-images and original QPI, we parameterize cell biophysical features such as volume, shape, opacity, and phase variance. Mean values of each biophysical phenotype are quantified within each sample batch, with batch distance representing the disparity in mean values across batches of the same samples. The batch distance for each biophysical phenotype is then compared between original QPI and CytoMAD-images. A reduction in batch distance indicates a decrease in batch-to-batch variations among samples.

Stated differently, the adoption of biophysical phenotypes takes precedence over bottleneck phenotypes (i.e. CytoMAD-profile). These biophysical characteristics possess reduced intricacy and greater ease of interpretation, rooted in human perception. This makes them highly suitable for extracting biological insights during subsequent analysis phases. Through the calculation of batch distance reduction centered on biophysical phenotypes, illumination is cast upon which specific biophysical traits are more susceptible to batch effects and display more pronounced correction through CytoMAD. This analytical methodology provides valuable cues about how batch effects impact a range of biophysical phenotypes and underscores CytoMAD's effectiveness in ameliorating these variations within each unique biophysical trait.

In terms of the preservation of biological information, the validation process leverages visual scrutiny with UMAP to corroborate CytoMAD's efficacy. This involves gauging the accuracy of cell type classification across batches using deep learning models. To ascertain the coherence of cellular data across diverse biological samples, UMAP analyses were executed using both no-CytoMAD-profile and CytoMAD-profile. This approach enables the visualization of the amalgamation status among distinct cell samples. Unlike the evaluation of batch effect mitigation, the amalgamation across cell samples signals inadequate preservation of biological information. The degree of conservation or enhancement in the separation between clusters of cell samples stands as a measure of the successful retention of biological information.

The capacity to preserve biological information is assessed through cell type classification, encompassing both CytoMAD-profile and CytoMAD-images. Phenotypic features (i.e. CytoMAD-profile) are classified using deep neural networks, featuring a model comprising three dense layers with 75, 50, and 25 nodes respectively, interconnected by rectified linear unit (ReLU) activation functions. The image-based classification employs a five-layer convolutional neural network. Each layer integrates 2D convolution, batch normalization, leaky ReLU activation functions, and max pooling operations. Both the deep neural network and convolutional neural network models undergo 100 epochs of training, utilizing the softmax function as the output activation and categorical cross-entropy loss as the loss function.

For a more comprehensive assessment of biological information preservation alongside batch-to-batch variation reduction, cell type classifiers are trained exclusively on one batch or selected batches of samples and then tested on unseen batches to evaluate cross-batch classification performance.

Example 1. Label-Free Identifications of Human Lung Cancer Cell Types and Subtypes The assessment of CytoMAD's performance encompasses the classification of seven distinct human lung cancer cell lines, each representative of one of three major lung cancer types: lung squamous cell carcinoma (LUSC) (H520, H2170), adenocarcinoma (LUAD) (H358, H1975, HCC827), and small cell carcinoma (SCLC) (H69, H526). To gauge its ability for batch correction, three distinct image batches are acquired for each cell line.

Briefly, seven lung cancer cell lines (H358, H1975, HCC827, H520, H2170, H526, and H69) are subjected to multi-ATOM imaging and analysis over the course of seven distinct days, generating three batches of approximately 120,000 cells per cell line. This accumulates to a total of over 1,000,000 single-cell images, each encompassing two label-free contrasts: BF and QPI. The lung cancer cell lines dataset serves as the basis for evaluating CytoMAD's performance across various dimensions. For training, the CytoMAD model utilizes 1,000 cells per cell line per batch, validation involves 200 cells per cell line per batch, and testing encompasses approximately 40,000 cells per cell line per batch.

Figure 2A:
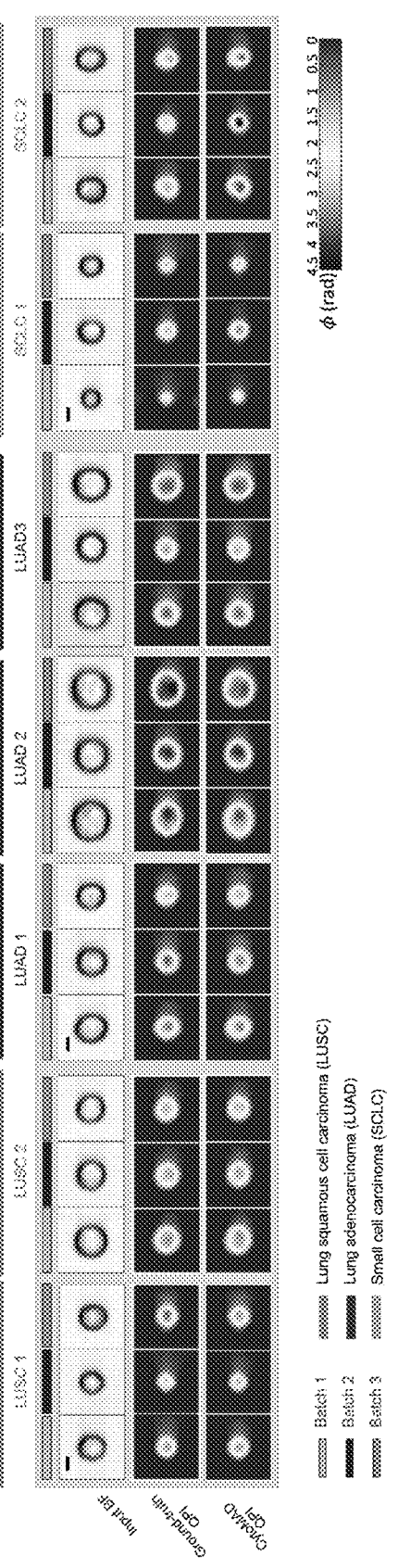
Figure 2B:
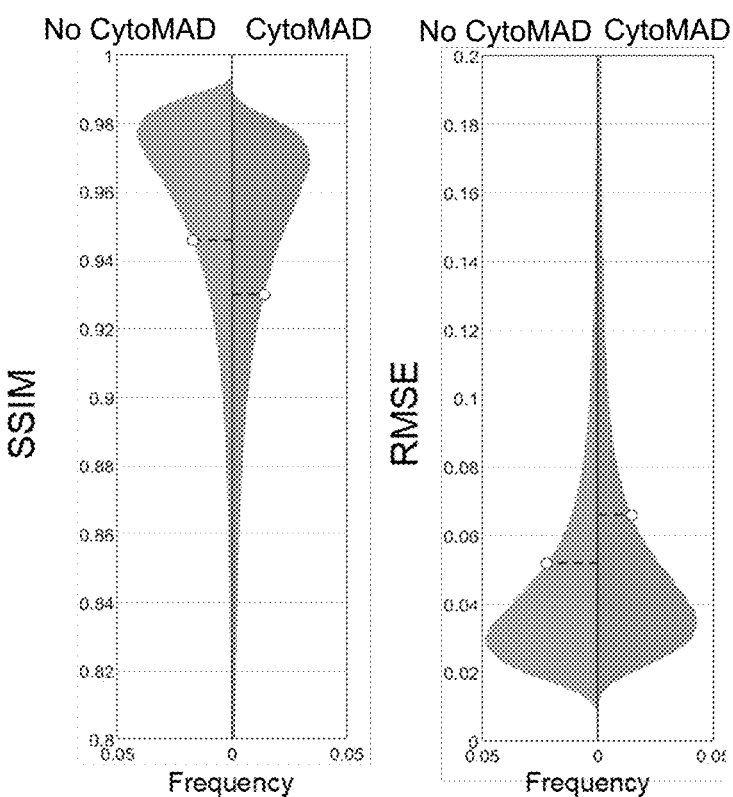

CytoMAD empowers image contrast translation, notably from bright-field to quantitative phase image (QPI), and furnishes batch-distilled cellular images, referred to as CytoMAD QPI. Visual representations of multi-ATOM label-free images of BF and QPI, alongside the corresponding CytoMAD batch-distilled QPI images (i.e. CytoMAD-images) for the seven lung cancer cell line types, are depicted in FIG. 2A. Evidently, CytoMAD QPI images closely mirror the ground truth QPI images. The quantification of image contrast translation is achieved through the calculation of structural similarity index (SSIM) and root mean square error (RMSE) values within the cell region. Violin plots portraying the distributions of SSIM and RMSE values are illustrated in FIG. 2B.

An evaluation of image translation performance is conducted between the full CytoMAD model and a counterpart model without the batch-aware morphology distillator (denoted as without CytoMAD). The average SSIM values for QPI are 0.9473 and 0.9305 for without CytoMAD (i.e. no-CytoMAD-images) and CytoMAD (i.e. CytoMAD-images), respectively. This indicates a high structural similarity between the generated QPI and the ground truth QPI, validating reliable image contrast conversion. Correspondingly, the average RMSE values for no-CytoMAD-images and CytoMAD-images are 0.0519 and 0.0654, respectively, affirming accurate phase value reconstruction. The congruent SSIM and RMSE values in both scenarios underscore comparable reconstruction performance after integrating the morphology distillation module into CytoMAD. The substantial SSIM and low RMSE values in CytoMAD QPI images substantiate the dependable conversion of image contrast from BF to QPI.

Within the morphology distillator module, cell type classifiers are trained utilizing CytoMAD's bottleneck latent features (i.e. CytoMAD-profile) (FIG. 2C) and translated images (i.e. CytoMAD-images) (FIG. 3) to gauge the preservation of biological information while mitigating batch-to-batch discrepancies. Training and validation are conducted on one batch, while classification performance is evaluated on two unseen batches. Referring to FIG. 2C, the cross-batch classification accuracy for the cell type classifier based on no-CytoMAD-profile is 0.2487, significantly improving to 0.7846 with CytoMAD-profile. The performance is further validated with CytoMAD images, yielding accuracies of 0.3280 without CytoMAD (i.e. no-CytoMAD-images) and 0.7768 with CytoMAD (i.e. CytoMAD-images) (FIG. 3). These noteworthy enhancements in cross-batch cell type classification, based on both CytoMAD profiles and images, underscore the preservation of biological information and its reliability. Additionally, this underscores CytoMAD's proficiency in mitigating batch-to-batch variations.

Figure 2D:
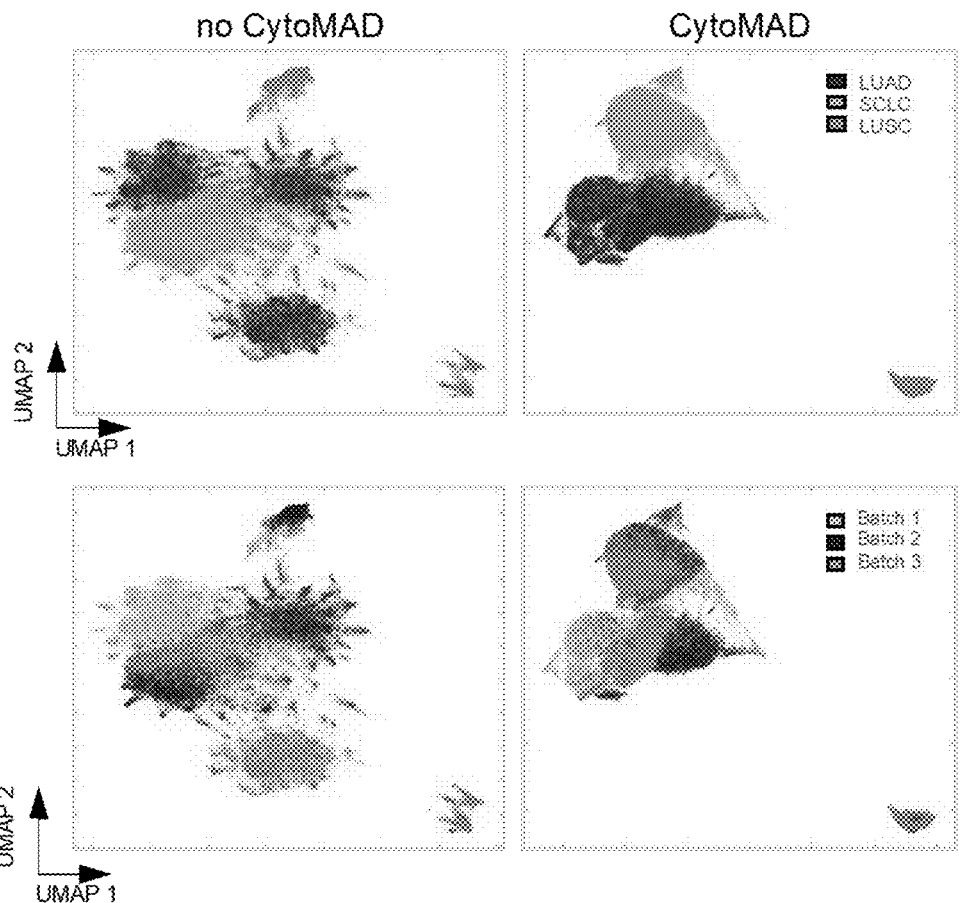
Figure 2E:
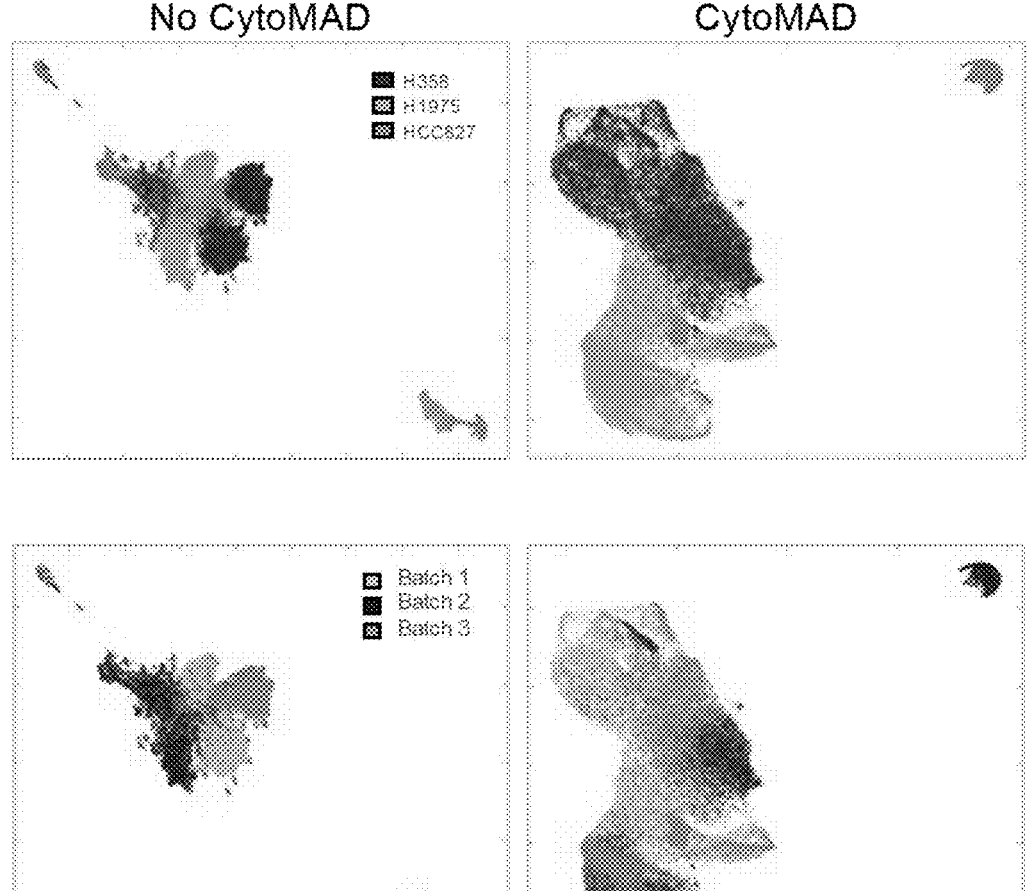

Uniform Manifold Approximation and Projection (UMAP) is harnessed to visually assess the mitigation of batch-to-batch variations and the retention of biologically significant cell type information. UMAP analysis is carried out on CytoMAD-profiles across the major lung cancer types (LUAD, LUSC, and SCLC) (FIG. 2D) and lung adenocarcinoma subtypes (H358, H1975, HCC827) (FIG. 2E). As depicted in FIG. 2D, without CytoMAD (i.e. no-CytoMAD-profile), distinct clusters emerge within the same cell type, notably in LUAD, indicating pronounced batch effects that obscure distinctions among the three principal cell type populations. Notably, UMAP computations entail 63,000 cell data points (7,000 cells per cell type per batch), with each data point denoting an individual cell. In contrast, CytoMAD consolidates different batches of the same cell type into single clusters, rendering the three major cancer types discernible. Analogously, in the LUAD subtype analysis (FIG. 2E), the absence of CytoMAD results in multiple clusters within the same subtypes, indicative of pronounced batch differences. The integration of CytoMAD yields unified clusters, accentuating the distinctiveness of the three subtypes. These findings substantiate CytoMAD's capacity to alleviate batch effects through batch-distilled phenotypic profiling.

Figures 2F, 2G:
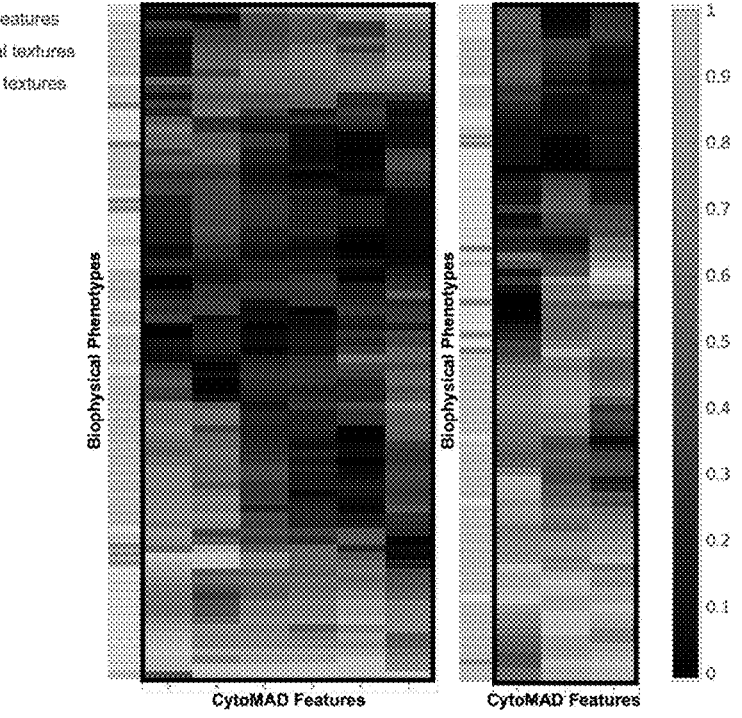
Figure 4A:
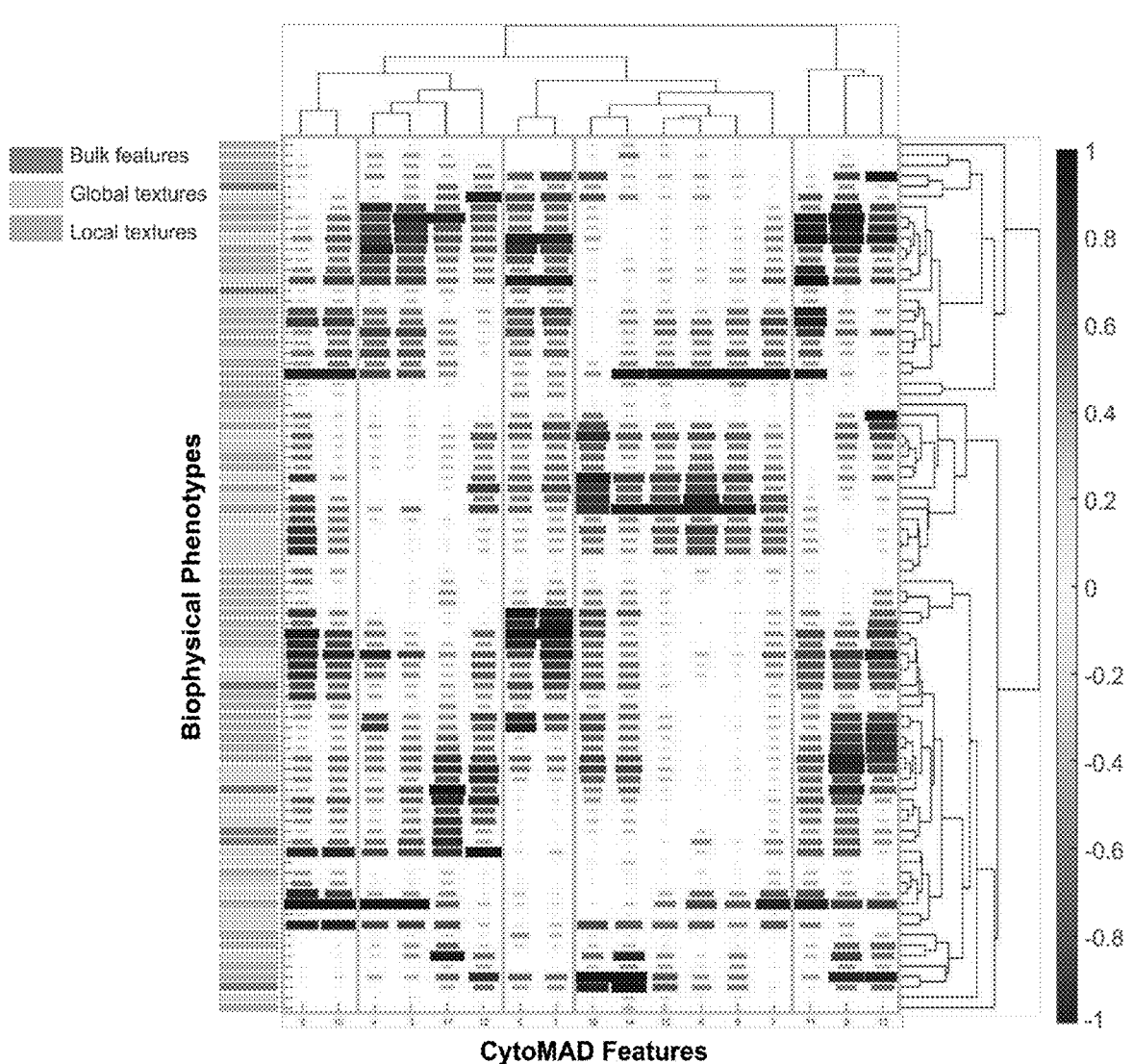
Figure 4B:
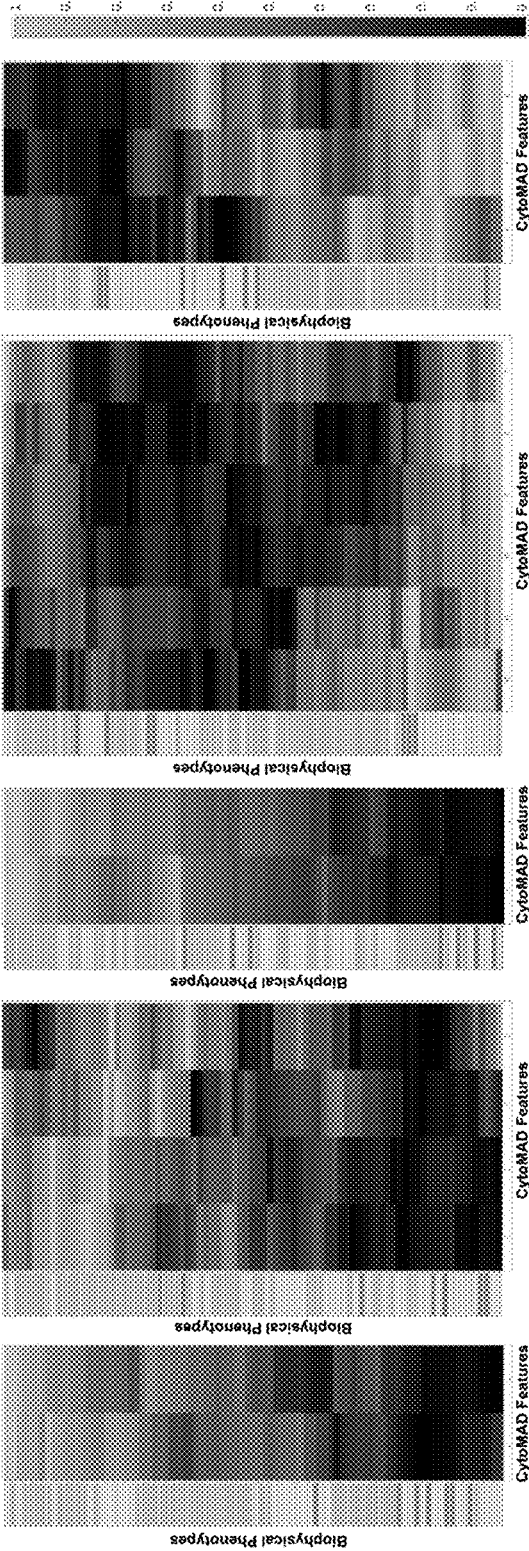

Further exploration of the interpretability of the self-supervised CytoMAD-profile is pursued to enhance model transparency and credibility, particularly pertinent in biomedical diagnosis. Specifically, the features of the CytoMAD-profile are correlated with hierarchical hand-crafted biophysical phenotypes of cells derived from CytoMAD output QPI and input BF images. The 84 hand-crafted biophysical phenotypes are extracted based on a hierarchical morphological feature extraction approach, demonstrating promise in label-free single-cell morphological profiling. Prominent CytoMAD features (i.e. features from CytoMAD-profile) are identified in classifying seven lung cancer cell lines based on feature importance and correlated with hand-crafted biophysical phenotypes, categorized into three groups: bulk features, global texture, and local texture of biophysical morphology (FIG. 4A). Hierarchical clustering groups the selected CytoMAD features into five clusters (FIG. 2F & FIG. 4B). Notably, one group demonstrates a strong correlation with global phenotypes, while another correlates with local optophysical phenotypes, providing valuable insights into the biological relevance of CytoMAD features.

Figure 2H:
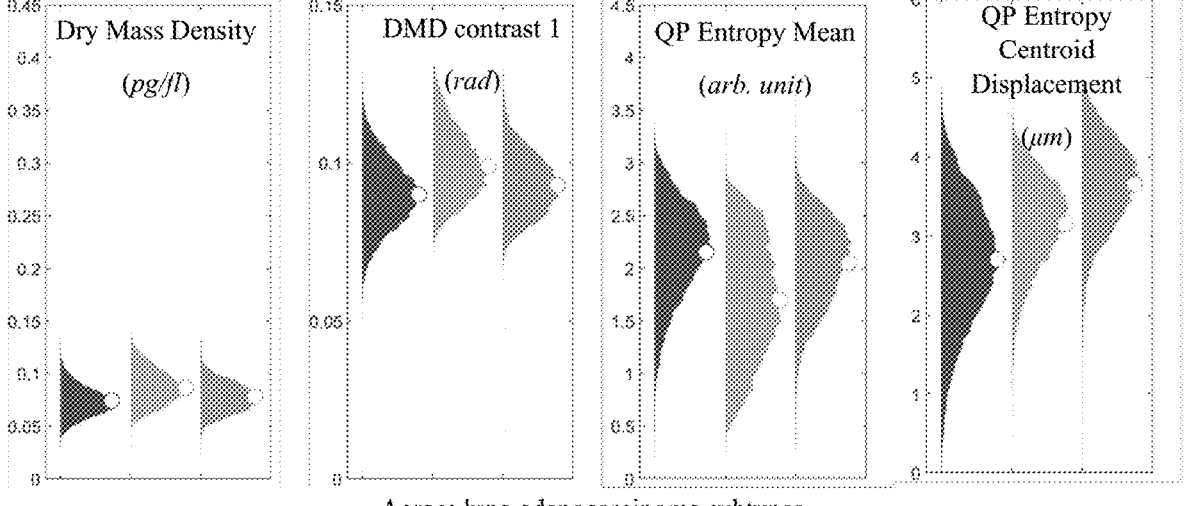
Figure 5:
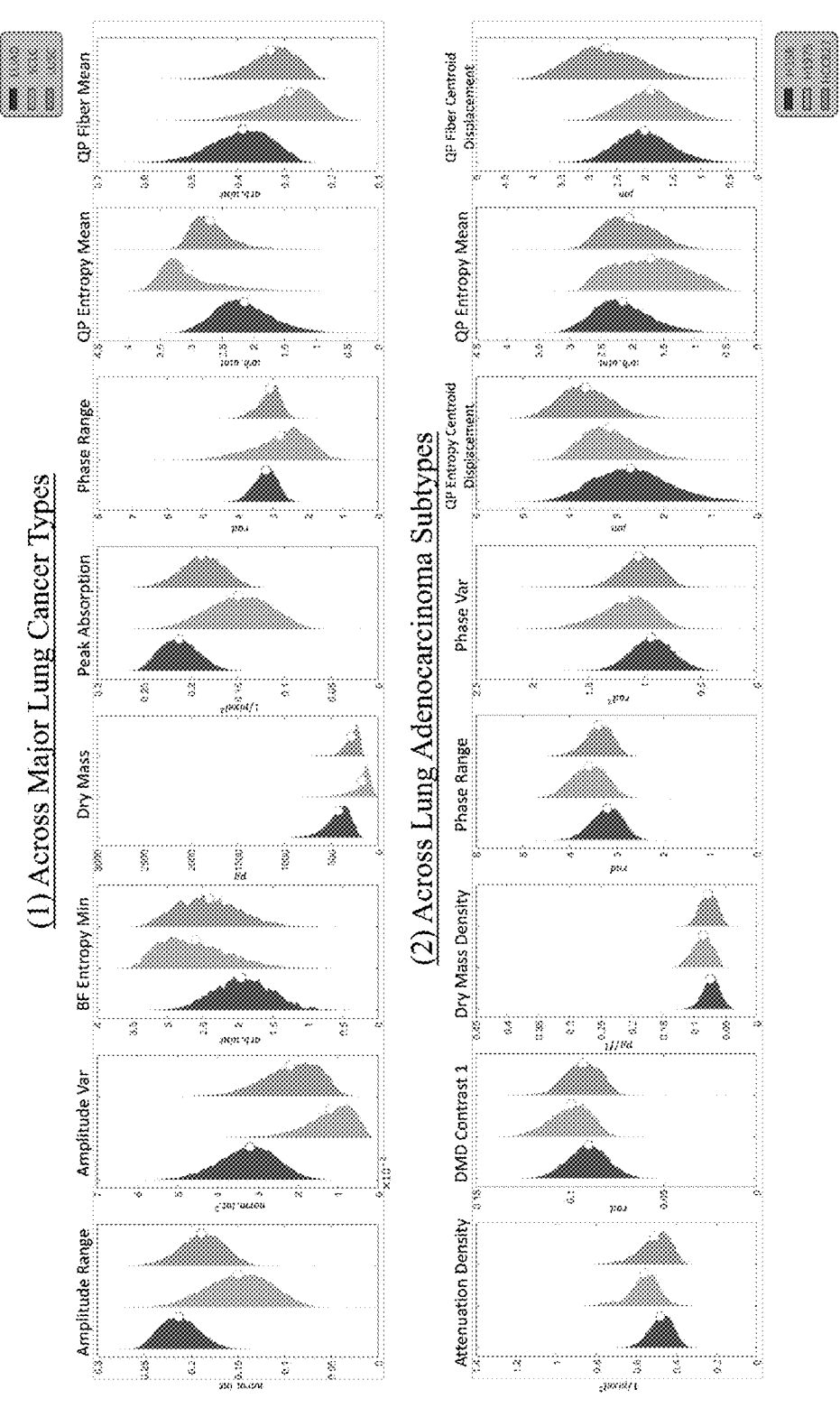
FIG. 5 shows the CytoMAD-based biophysical phenotypes across lung cancer types and subtypes.

CytoMAD results are further scrutinized to illustrate variations across major lung cancer types and LUAD subtypes, akin to the UMAP analysis. The distributions of biophysical phenotypes (readout from CytoMAD images) are compared across different cancer types (FIG. 2G) and adenocarcinoma subtypes (FIG. 2H). Noteworthy disparities emerge in certain biophysical phenotypes across the three major cancer types (FIG. 2G), including cell dry mass (bulk feature, effect size d=0.40), opacity variance (global texture of cell opacity, effect size d=0.57), and QP entropy mean and QP fiber mean (local textures of quantitative phase, or equivalently dry-mass density, effect size d=0.44 and d=0.30 respectively). In contrast, variations among LUAD subtypes (FIG. 2H) are more nuanced, suggesting a relatively consistent cellular morphology between subtypes compared to the variations observed across different cancer types (FIG. 2H, and FIG. 5).

Example 2. Delineating Cellular Responses to Drug Treatments with CytoMAD

Morphological profiling is emerging as a promising technique in drug screening; however, the presence of batch effects poses a significant challenge. In this context, the efficacy of the CytoMAD approach is evaluated using label-free drug response assays conducted on LUSC (H2170) cells treated with docetaxel, afatinib, and gemcitabine at various concentrations across two distinct batches. This comprises 18 distinct drug treatment conditions, encompassing five concentration levels and one negative control. During the CytoMAD training process, only batch information and drug types are provided, withholding specific drug concentration data. This allows for the evaluation of the model's self-supervised capability to capture morphological changes across concentrations.

Figure 6A:
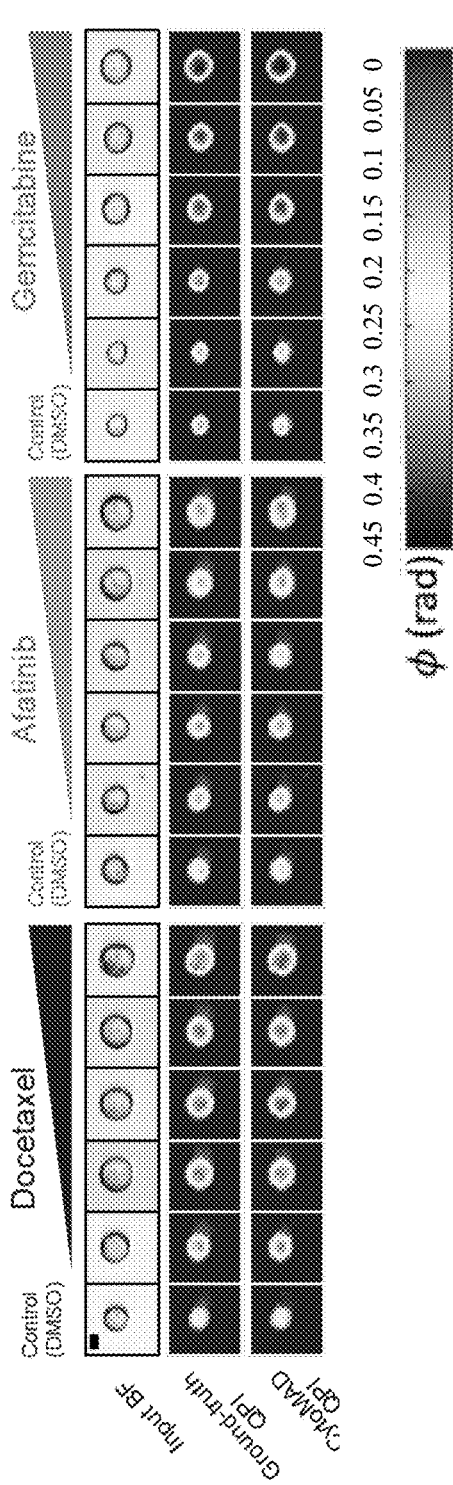
Figure 7:
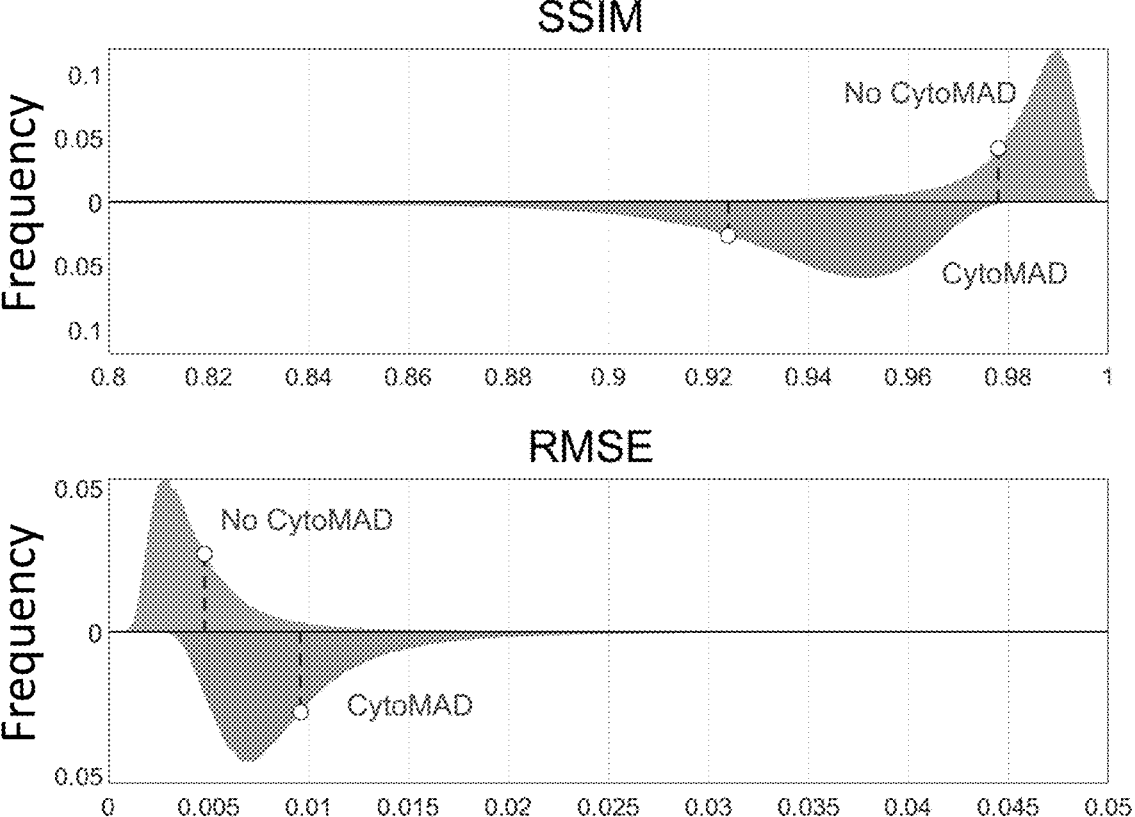
FIG. 7 shows the SSIM and RMSE distributions of H2170 in the drug assays, the average SSIM of no-CytoMAD QPI and CytoMAD QPI are 0.9795 and 0.9241, while for RMSE, the average values of cGAN QPI and CytoMAD QPI are 0.0049 and 0.0098.

A comparison between single-cell label-free input images (bright-field and QPI) and CytoMAD QPI images (i.e. CytoMAD-images) is presented (FIG. 6A). Notably, CytoMAD QPI images closely mirror the ground truth QPI images, demonstrating a high SSIM of 0.9241 and a low RMSE of 0.0098 (FIG. 7). These outcomes underscore the reliability of CytoMAD's image contrast conversion in drug response assays.

Figure 6B:
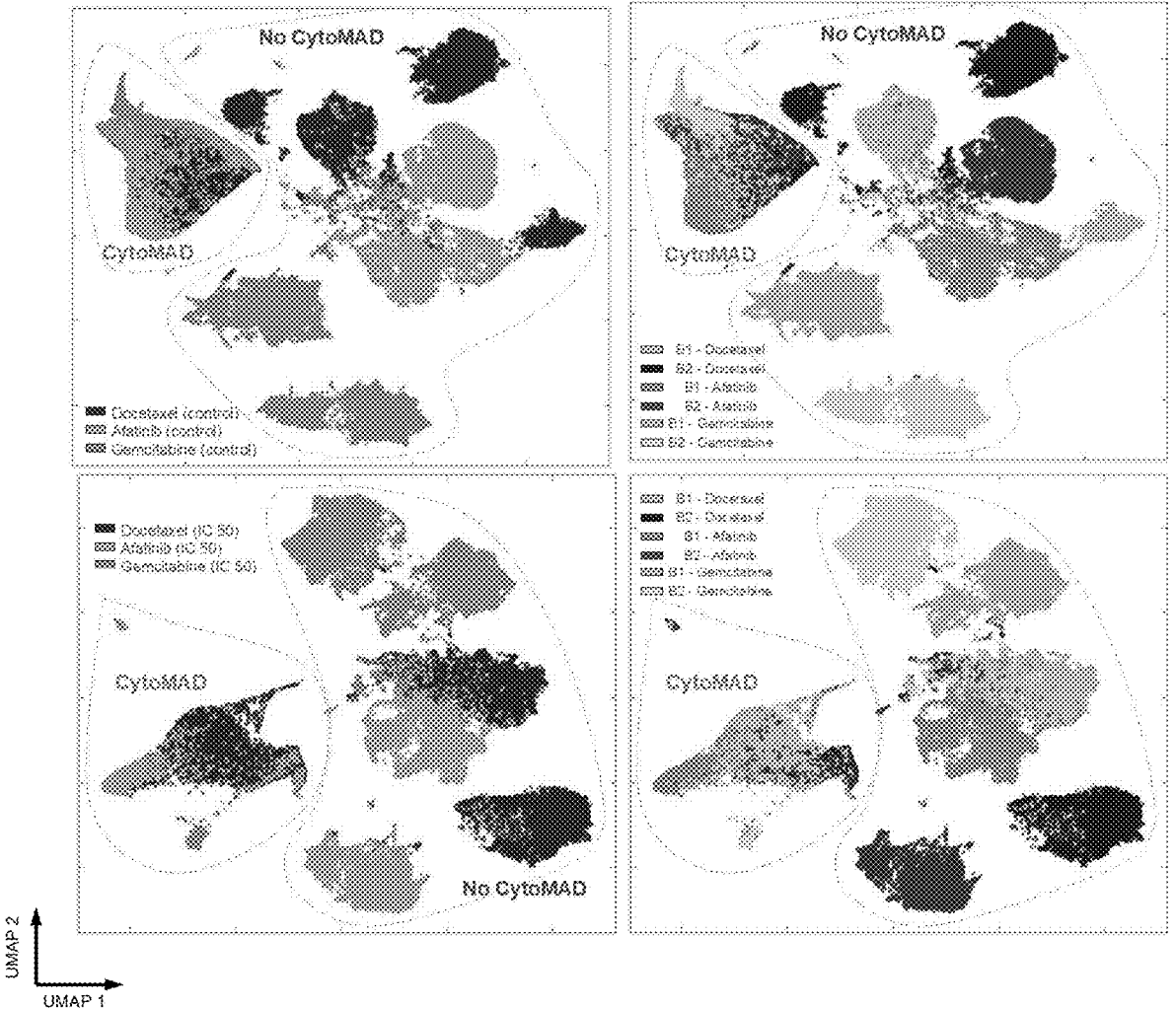

The assessment of the reduction in batch variations while preserving cellular information involves UMAP analyses on negative control samples (DMSO) and IC50 samples from different drug treatments (FIG. 6B). Pre-CytoMAD implementation (i.e. no-CytoMAD), distinct batch-related patterns are observed on the UMAP plot, indicative of batch effects. Following the application of CytoMAD, negative control samples tend to converge into a single group, with six batches overlapping. In contrast, the CytoMAD-profiles successfully bring the IC50 samples together, forming distinct clusters specific to individual drug treatments.

Figure 6C:
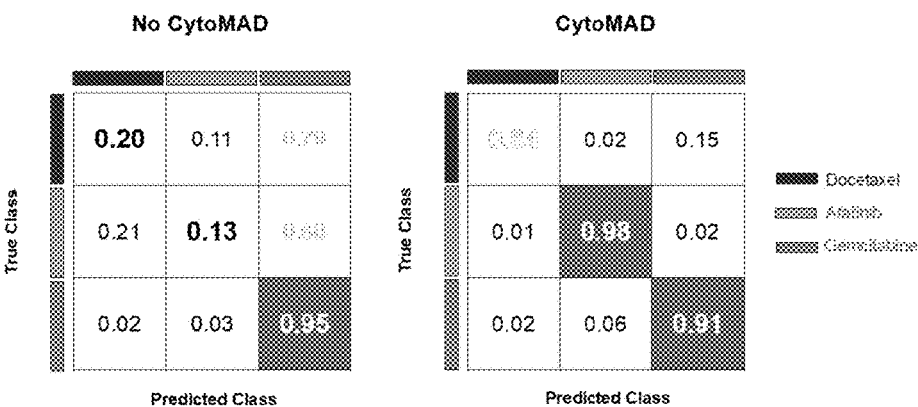

To further quantify CytoMAD's ability to discern treatment responses, drug treatment classifiers are trained using IC50 samples. The training and validation sets comprise a single batch, with 2,000 and 500 cells per treatment, respectively. Cross-batch classification, tested on an unseen batch with 2,500 cells per treatment, yields accuracies of 0.91 with CytoMAD, a significant improvement over the accuracy of 0.43 without CytoMAD (FIG. 6C). This notable enhancement underscores CytoMAD's effectiveness in mitigating batch differences while preserving treatment-related distinctions.

microtubule stabilizing agent, Afatinib as tyrosine kinase inhibitor in targeted therapy and Gemcitabine as antimetabolite), each with 5 concentration levels and a negative control with dimethyl sulfoxide (DMSO) for 24 hours as listed in Table 1. They are imaged using multi-ATOM for single-cell BF and QPI images on 6 days, forming 2 batches with ~100,000 cells per drug. Basically, this dataset consists of 2 batches of data, with each batch containing 3 different drug treatments and each treatment comprising 6 different concentration conditions. This results in 18 unique drug treatment conditions in each batch.

TABLE 1

| Docetaxel | | Afatinib | | Gemcitabine | |
|---|---|---|---|---|---|
| Annotation | Concentration | Annotation | Concentration | Annotation | Concentration |
| D1 | 0.000376 μM | A1 | 0.0019 μM | G1 | 0.000751 μM |
| D2 (IC50*) | 0.00376 μM | A2 (IC50*) | 0.019 μM | G2 (IC50*) | 0.00751 μM |
| D3 | 0.0188 μM | A3 | 0.095 μM | G3 | 0.01502 μM |
| D4 | 0.0376 μM | A4 | 0.19 μM | G4 | 0.0751 μM |
| D5 | 0.376 μM | A5 | 1.9 μM | G5 | 0.751 μM |
| | | | DMSO | | |
| Control | 0.367% | Control | 0.19% | Control | 0.3755% |

IC50* denotes half-maximal inhibitory concentration of drug.

Figure 6D:
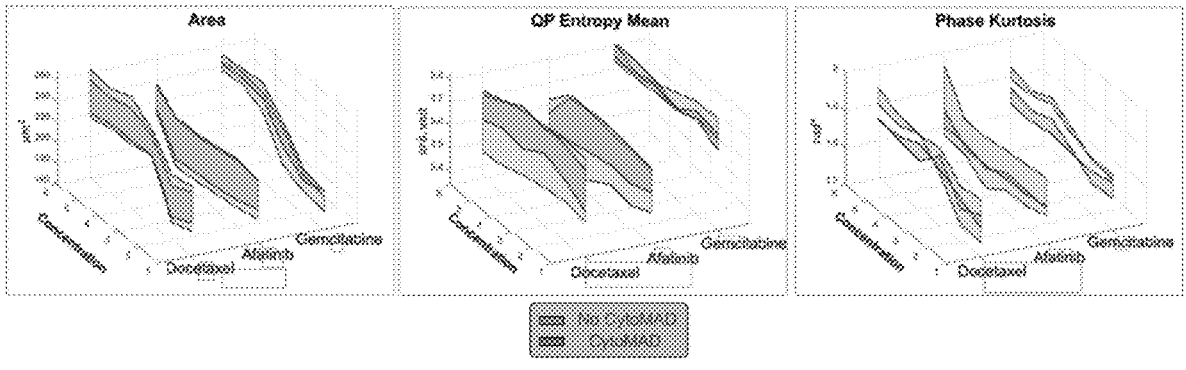
Figure 8:
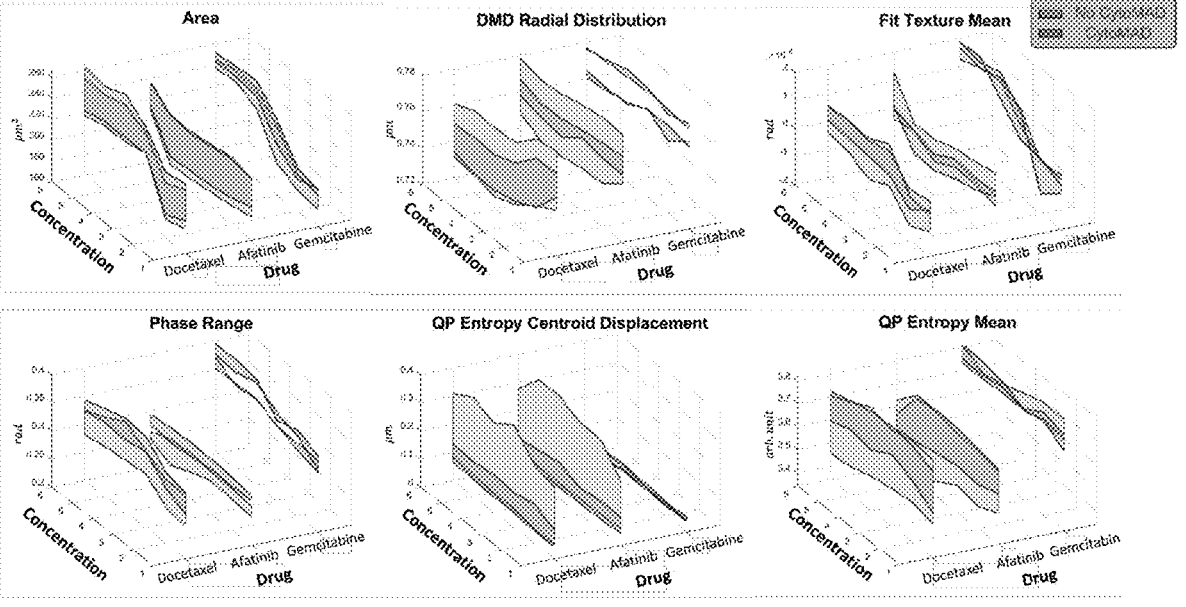
FIG. 8 shows the batch distance on biophysical phenotypes along drug concentration.
Figure 8:
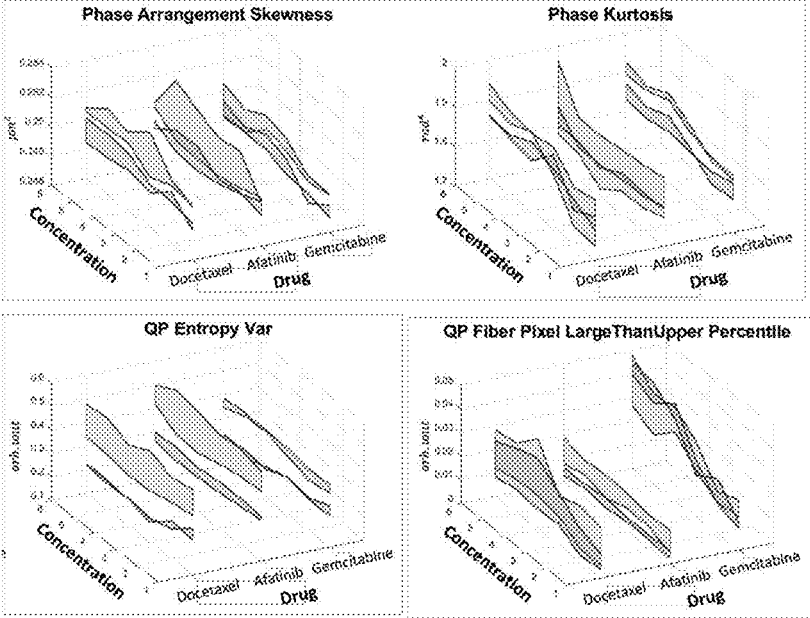

The quantification of CytoMAD's morphology-distillation capability involves the measurement of differences in hand-crafted biophysical phenotypes, extracted from CytoMAD-images, among batches for each drug treatment (FIG. 6D and FIG. 8). By analyzing the trends of biophysical phenotypes with different drug concentrations, it becomes evident that CytoMAD effectively narrows the range of uncertainty in most biophysical phenotypes, as depicted by the reduced shaded area (from the without CytoMAD group to the CytoMAD group) in comparison to the no-CytoMAD scenario (FIG. 6D and FIG. 8). This underscores CytoMAD's capability to diminish batch-related differences in cell biophysical phenotypes, including area (bulk features), phase kurtosis (global texture features), and QP entropy mean (local texture features). Crucially, the consistent trends along drug concentrations between the without CytoMAD and with CytoMAD groups signify the preservation of progressive changes within the CytoMAD model, despite the exclusion of concentration information during training.

Figure 6E:
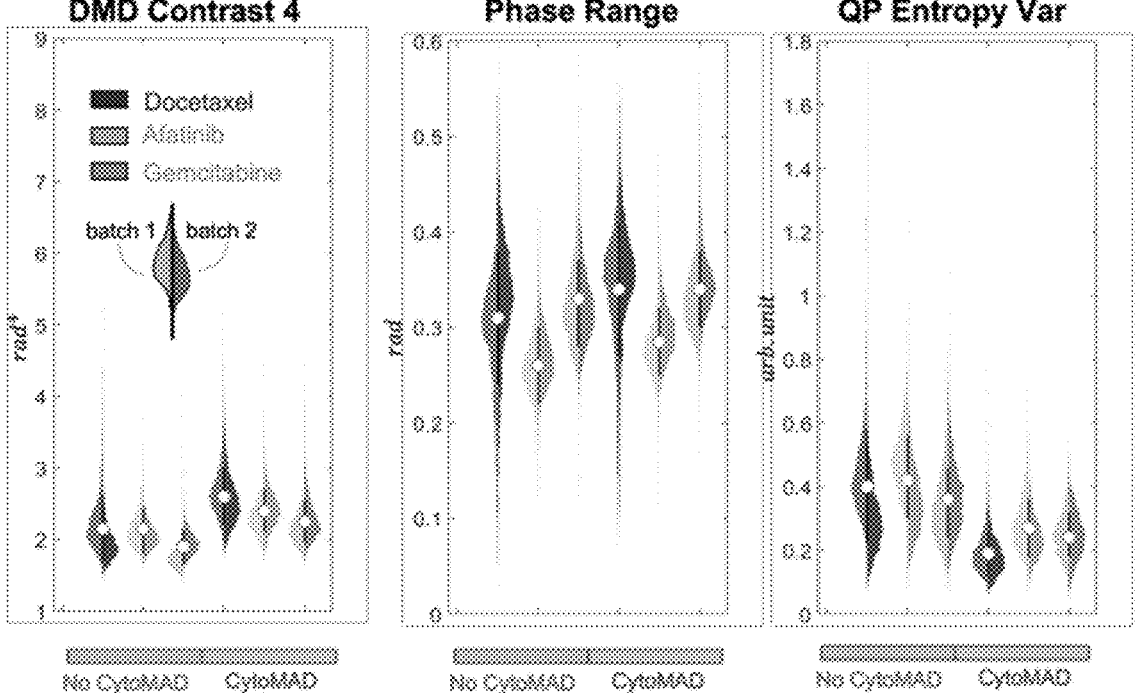
Figure 9:
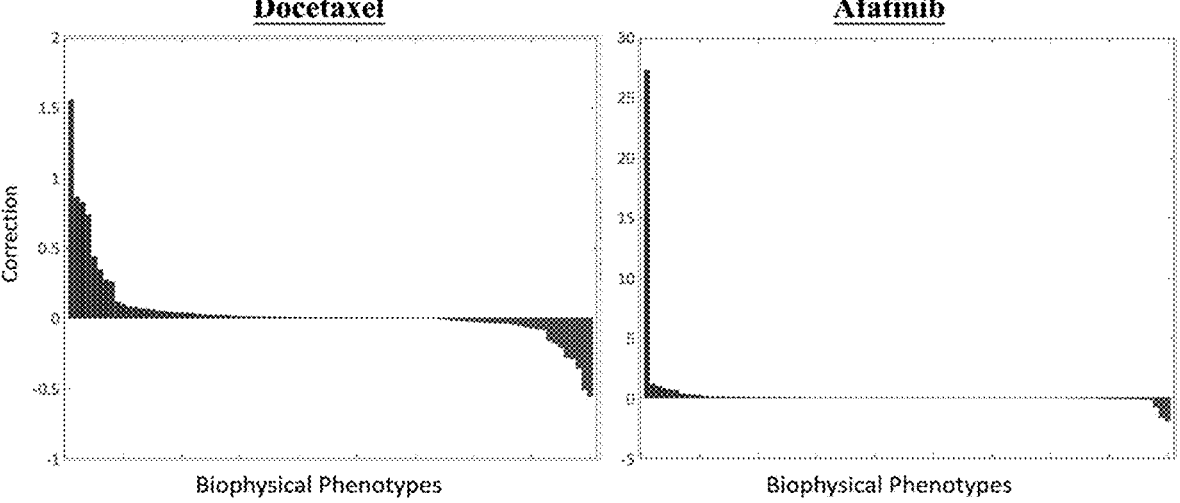
FIG. 9 depicts the batch distance correction ratio after CytoMAD.
Figure 9:
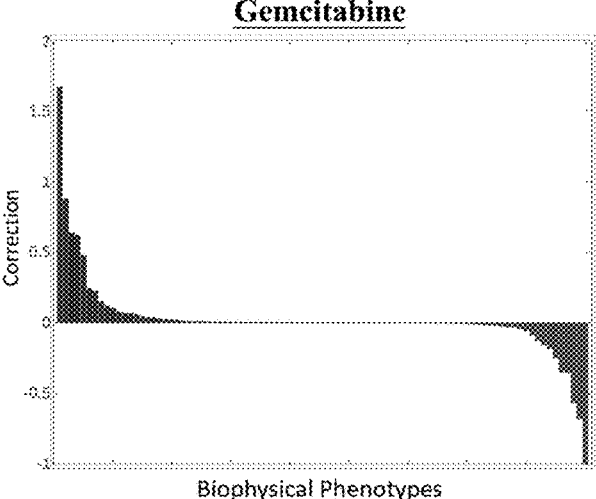
Figure 10A:
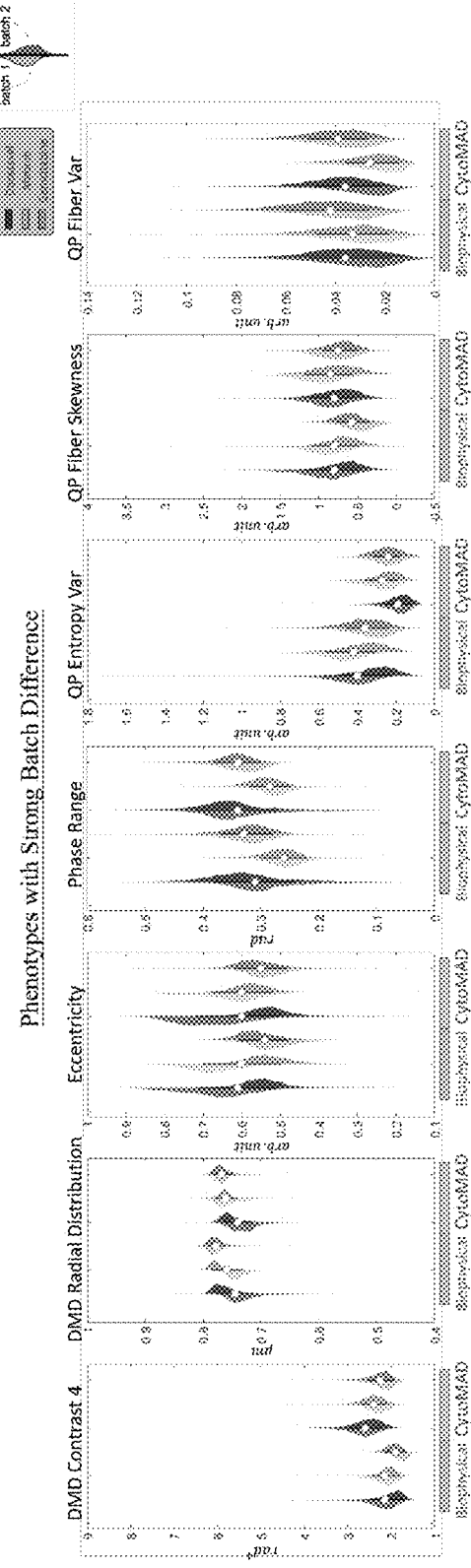
FIGS. 10A and 10B demonstrate the violin plots of biophysical phenotypes across IC50 samples.
Figure 10B:
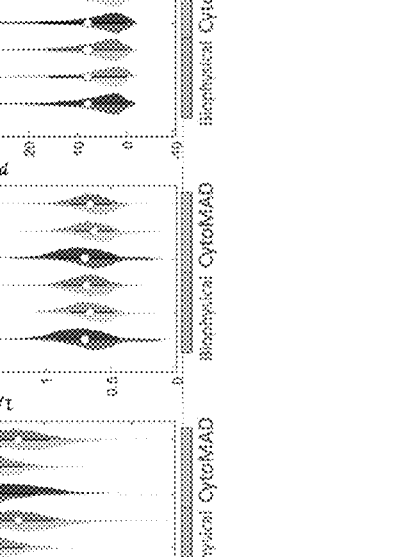

FIG. 6E further illustrates how CytoMAD reduces batch-related differences in different biophysical phenotypes in IC50 samples treated with distinct drugs. Through the quantification of changes in each biophysical phenotypic value after CytoMAD using batch distance correction ratios (FIG. 9), phenotypes with pronounced and subtle batch corrections are identified (FIG. 6E and FIGS. 10A-10B). Notably, the enhanced symmetry in violin plots following the application of CytoMAD (comparing the left three violins with the right three) unequivocally indicates reduced batch differences in the distributions of biophysical phenotypes, underscoring the effectiveness of CytoMAD.

Comparative analysis of phenotypic distributions across different drug treatments (representing different colored violins) showcases preserved patterns before and after the implementation of CytoMAD, confirming its capacity to retain cellular information. To further verify the cellular phenotypic preservation capacity of CytoMAD model, treatment response experiment is conducted with lung cancer cell line H2170. In this experiment, H2170 are treated with drugs of different mechanism of action (MoA) (i.e. Docetaxel as In contrast to the lung cancer cell lines dataset, which encompasses diverse cell types, this dataset is comprised of a singular cell type subjected to varying drug concentration conditions (specifically, 5 concentration levels and 1 negative control) and multiple drug treatments (including docetaxel, afatinib, and gemcitabine). As a result, this dataset is anticipated to reveal more subtle and gradual changes as the drug concentration increases across samples, rather than distinct clusters corresponding to different cell types. The training approach for the CytoMAD model involves 1,000 cells per drug treatment condition per batch, validation entails 500 cells per cell line per drug treatment condition per batch, and testing encompasses 5,000 cells per drug treatment condition per batch. To assess CytoMAD's capacity for preserving progressive changes along drug concentration gradients, the model is provided solely with batch information and drug treatment types (docetaxel, afatinib, and gemcitabine) to guide batch-aware morphology distillation. The intentional omission of drug concentration information in the model inputs allows for a rigorous evaluation of CytoMAD's effectiveness.

Significant differences in specific biophysical phenotypes across treatments, including global texture features (DMD contrast 4, effect size d=0.19; phase range, effect size d=0.24) and local texture features (QP entropy variance, effect size d=0.17), are notable (FIG. 6E). These findings provide insights into distinct label-free morphological responses to the three drug treatments, aligning with the known diverse mechanisms of action (MoA) of these pharmaceutical agents.

Example 3. Label-Free Biophysical Single-Cell Analysis of Non-Small-Cell Lung Cancer Biopsies Unraveling the intricate biological processes that underlie tumor invasiveness, metastasis, and therapy resistance in non-small-cell lung cancer (NSCLC) is of paramount importance for combatting its devastating impact on global cancer-related mortality. Among these processes, epithelial-mesenchymal plasticity (EMP), particularly the epithelial-mesenchymal transition (EMT), emerges as a central driver of tumor malignancy, marked by the loss of epithelial markers and the acquisition of mesenchymal markers such as vimentin. In this context, the innovative CytoMAD approach is harnessed to investigate whether label-free biophysical cell morphologies can effectively capture subtle changes linked to EMP and related phenotypes in NSCLC biopsies from diverse patients.

This example incorporates samples collected from four NSCLC patients at the Queen Mary Hospital of Hong Kong, encompassing resected lung tumor tissue, normal lung tissue, and 9 mL peripheral blood samples. The study is conducted with the necessary written consents for clinical care and research purposes, with ethical clearance from the Institutional Review Board at the University of Hong Kong. Following preprocessing steps such as disaggregating tissue into single-cell suspensions and red blood cell lysis, patient samples are subjected to multi-ATOM imaging across separate dates, forming four batches and yielding around 180,000 cells, each paired with label-free bright-field (BF) and quantitative phase imaging (QPI) contrasts. CytoMAD's training leverages patient tumor and blood samples, with 1,000 cells and 500 cells per sample per patient allocated for training and validation, respectively. Subsequently, its performance is evaluated using over 120,000 cells from resected tumors and peripheral blood, in addition to approximately 56,000 cells sourced from previously unseen patients' normal lung tissue.

Figure 11:
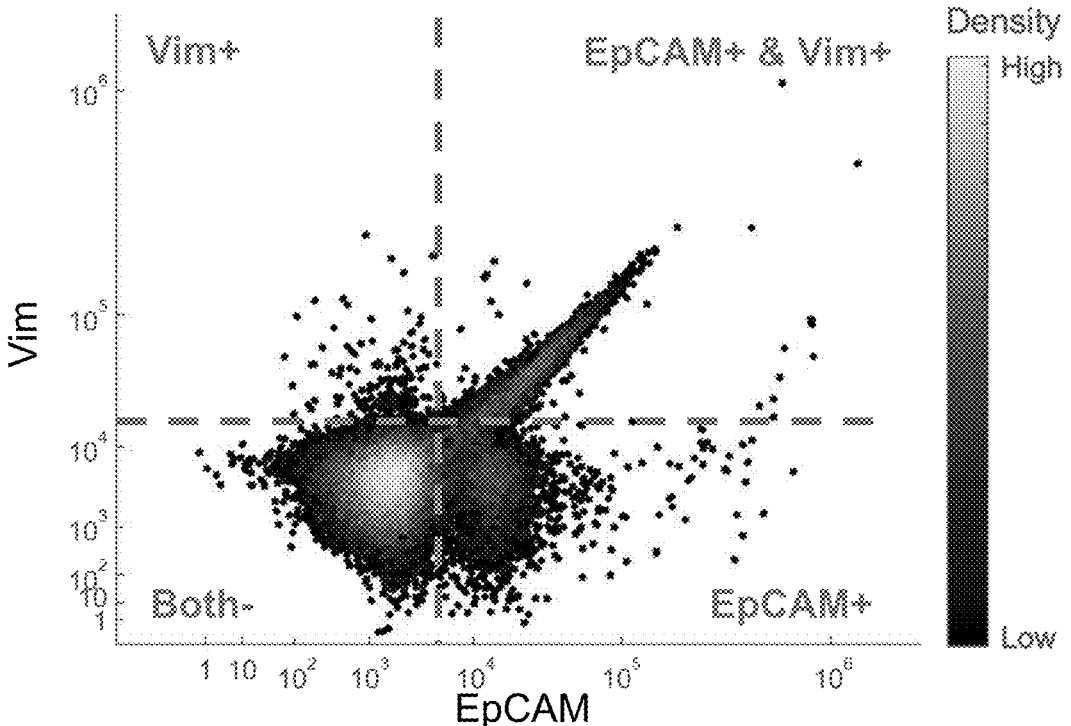
FIG. 11 depicts NSCLC EpCAM and vimentin fluorescence signals and gating.

In the absence of universal molecular markers signifying the mesenchymal state in all EMT programs, fluorescence staining involving epithelial cell adhesion molecule (Ep-CAM) and vimentin (Vim) antibodies is incorporated to indicate cells exhibiting epithelial-mesenchymal plasticity (EMP). This term, also known as partial EMT, refers to cells expressing a mix of epithelial and mesenchymal phenotypes. The cells are categorized into four groups: EpCAM positive (EpCAM+), Vim positive (Vim+), both EpCAM and Vim positive (EpCAM+& Vim+), and non-fluorescent cells (Both-) (see FIG. 11). The presence of EpCAM suggests potential epithelial or cancerous cells, while Vim+ cells are considered mesenchymal. Cells designated as Both+ represent those with EMP.

Figure 12A:
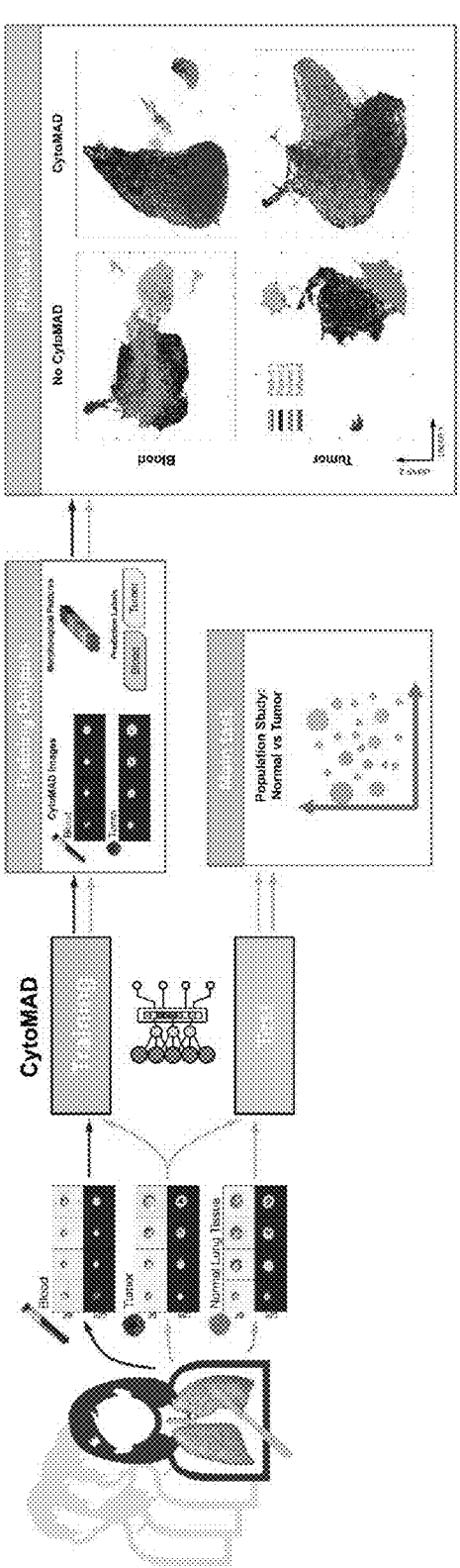

Addressing the potential challenges posed by batch-to-batch variations due to the multi-day experiments involving patient samples, CytoMAD is introduced as a solution. By generating batch-distilled phenotypic profiles and images, CytoMAD mitigates batch effects (see FIG. 12A). Notably, tumor and blood samples are chosen for CytoMAD training due to their significant heterogeneity and distinct cellular characteristics, aiding the model in disentangling valuable biological insights from batch-related distortions. Unique sample type classifiers (tumor vs. blood) are employed in the morphological distillation process to guide biological information preservation. The model is trained to furnish batch-distilled phenotypic features and images, along with additional conversion of BF images to QPI. The high degree of heterogeneity within clinical samples underscores Cyto-MAD's capacity for capturing cellular phenotypes. Its performance is initially validated using resected tumors and peripheral blood for pretext tasks. Moreover, CytoMAD's capabilities are extended to unseen patients' normal lung tissue, allowing for an assessment of its performance on novel datasets.

Figure 13:
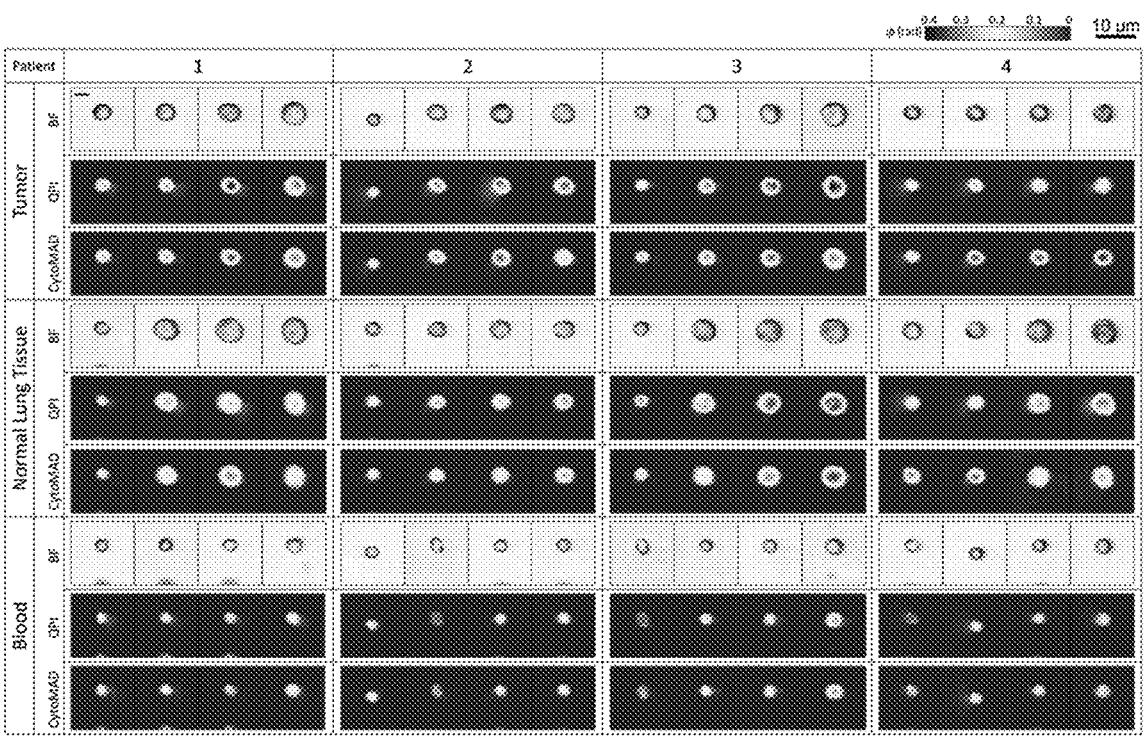
FIG. 13 depicts the NSCLC samples images from multi-ATOM and CytoMAD results.
Figures 14A, 14B:
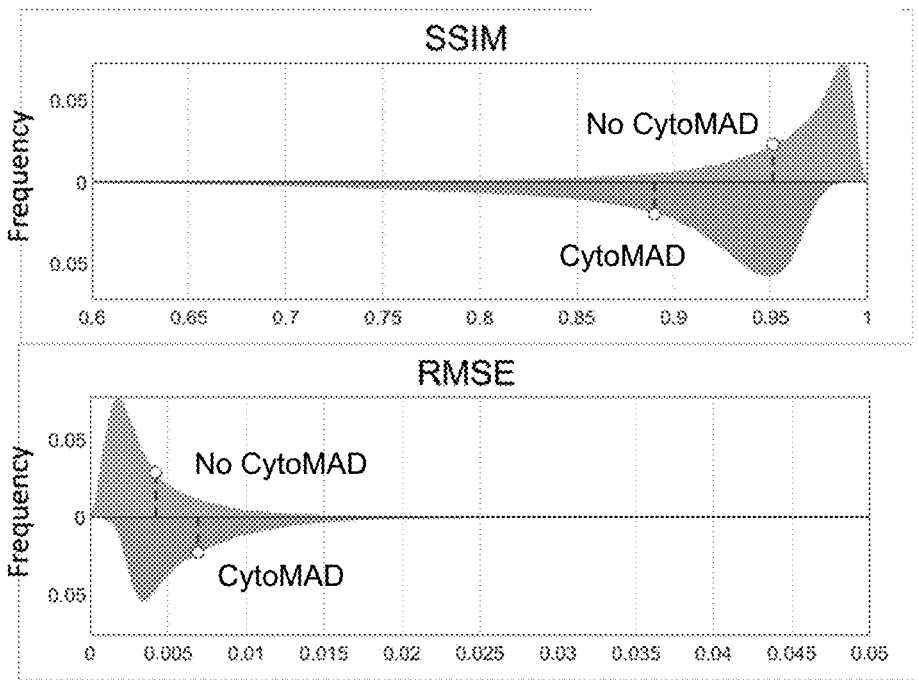
FIGS. 14A-14B depict the SSIM and RMSE of NSCLC samples, in which FIG. 14A are the violin plots on SSIM and RMSE distribution

The NSCLC sample images and CytoMAD-generated QPIs (i.e. CytoMAD-images) are showcased in FIG. 13. Notably, tumor and normal lung tissue samples exhibit a high degree of cellular heterogeneity with varying cell sizes, while blood samples contain relatively smaller cells. Similarity measurements in terms of structural similarity index (SSIM) and root mean square error (RMSE) are computed to ascertain the resemblance between ground truth QPI and CytoMAD-images at the cellular level (FIGS. 14A-14B). This analysis yields an average SSIM of 0.8881 and an average RMSE of 0.0084, demonstrating the model's reliability in translating image contrast, even in the case of unseen data like normal lung tissue, where the model was not trained with such samples.

Figure 15:
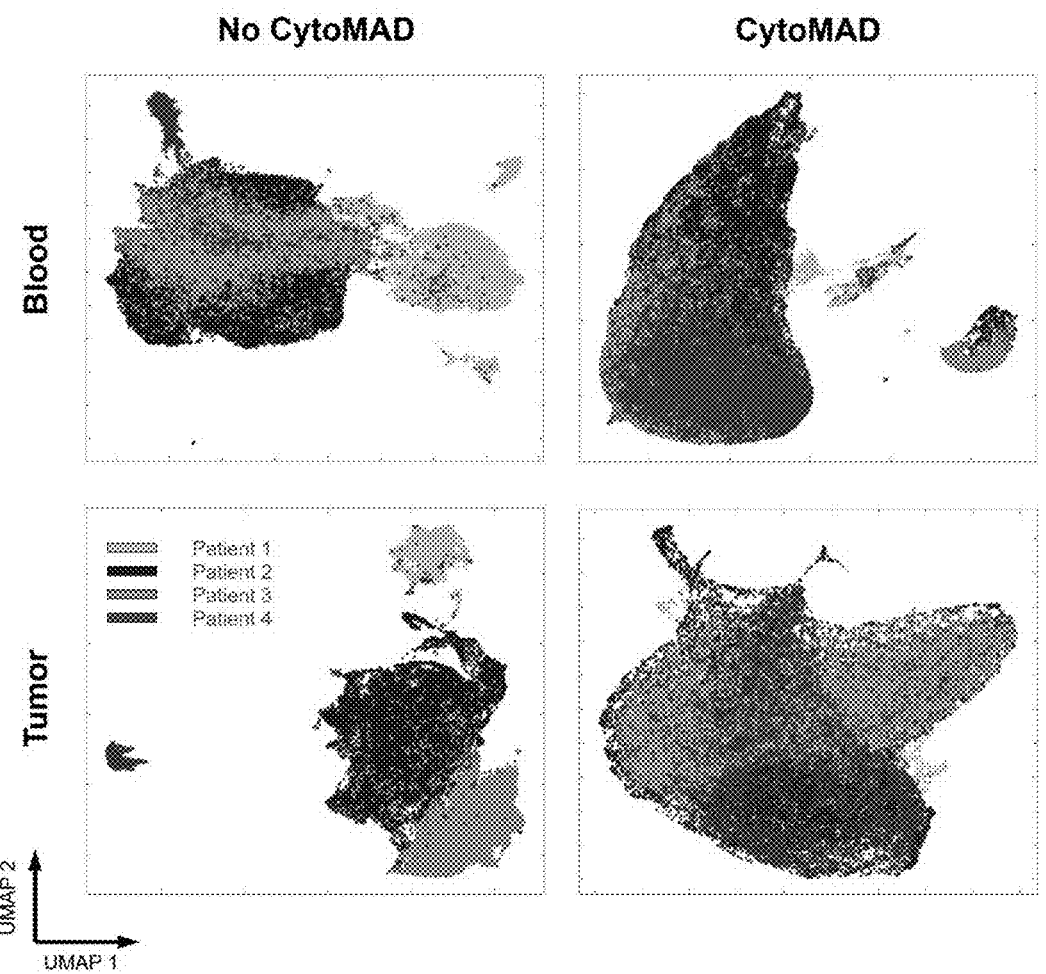
FIG. 15 depicts the UMAP on NSCLC blood and tumor samples.

CytoMAD's effectiveness in reducing batch-to-batch variations among patient samples through pretext tasks involving tumor and blood samples is further validated (FIG. 15). The model's batch removal efficacy is examined through UMAP analysis based on the CytoMAD-profile. Before CytoMAD intervention, distinct batch-related colors on the graph remain largely separate, with minimal overlapping, especially in the context of tumor samples. This outcome suggests the presence of pronounced batch effects. Impressively, after applying CytoMAD, the colors converge significantly, indicating a successful reduction in batch differences across patient samples. The resulting CytoMAD outputs are poised for downstream clinical analysis.

Figure 12B:
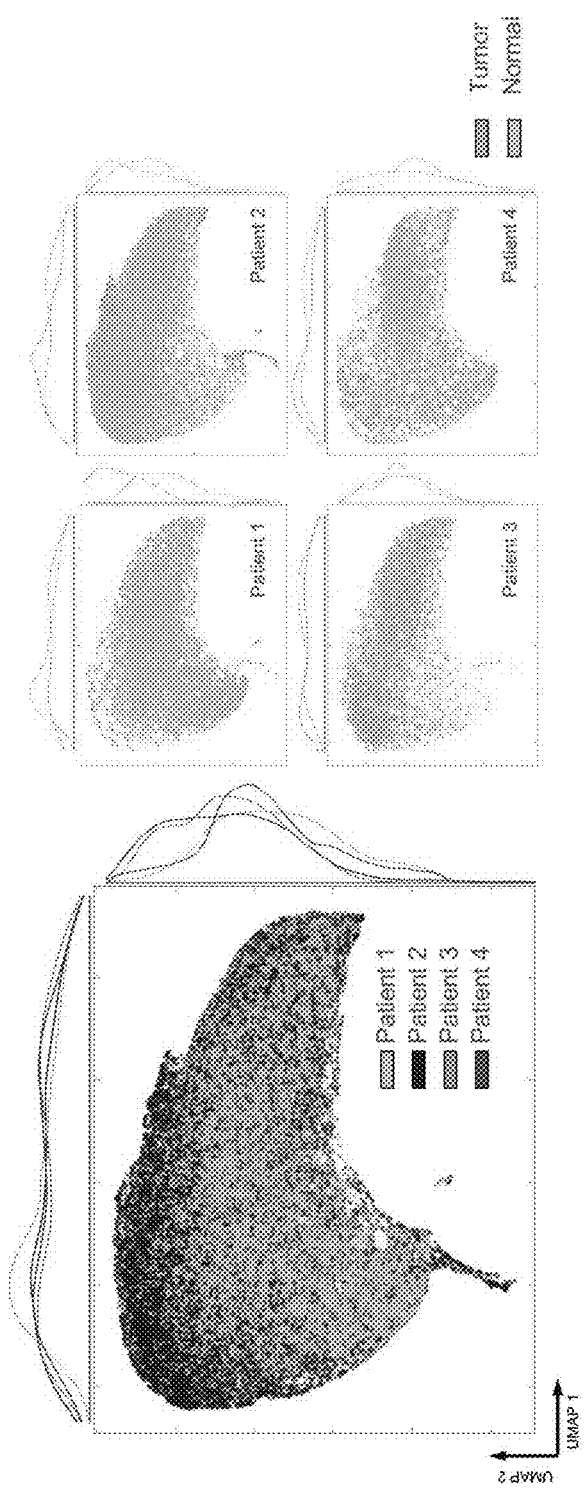

A comprehensive single-cell-based population study is conducted using clinical NSCLC patient samples, focusing on a comparison between resected tumors and normal lung tissue. Given the emphasis on cancerous cells and those undergoing EMT, EpCAM+ and Both+ cell groups are selected for in-depth evaluation. UMAP analyses based on CytoMAD batch-distilled phenotypic profiles (i.e. Cyto-MAD-profile) (see FIG. 12B) reveal substantial overlap and mixing between different batches of tumor and normal lung tissue samples, indicating the absence of significant batch effects within the dataset. Furthermore, UMAP plots are calculated for each patient to visualize population differences between resected tumor and normal lung tissue samples. Distinct outlying clusters and non-complete overlapping between tumor and normal lung tissue populations are observed within each patient, highlighting biophysical variations among cells from tumor and normal lung tissue.

Figure 12C:
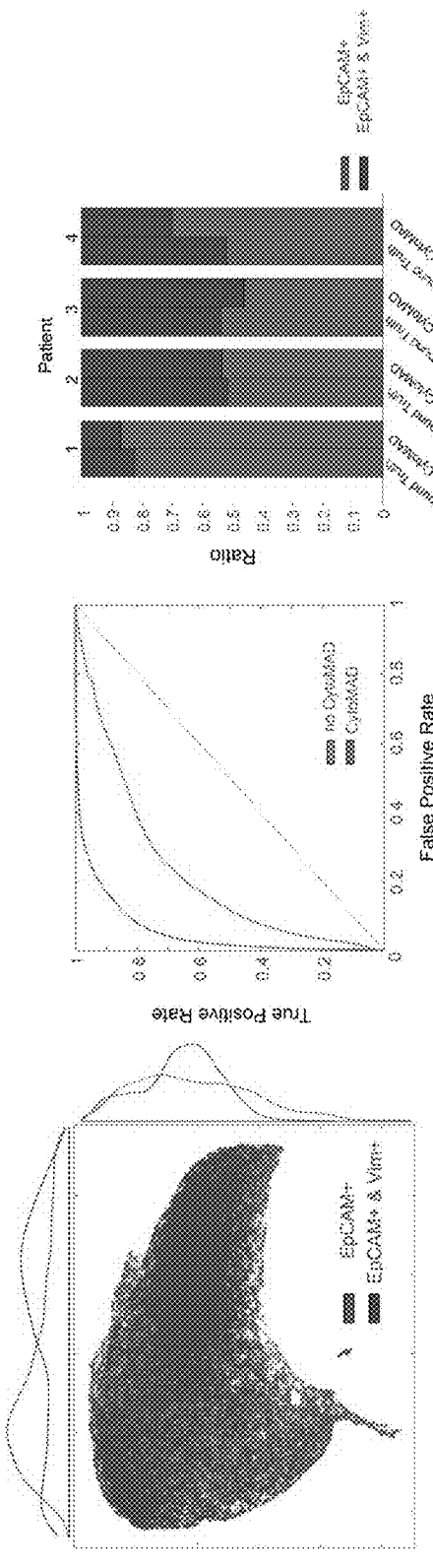
Figure 16A:
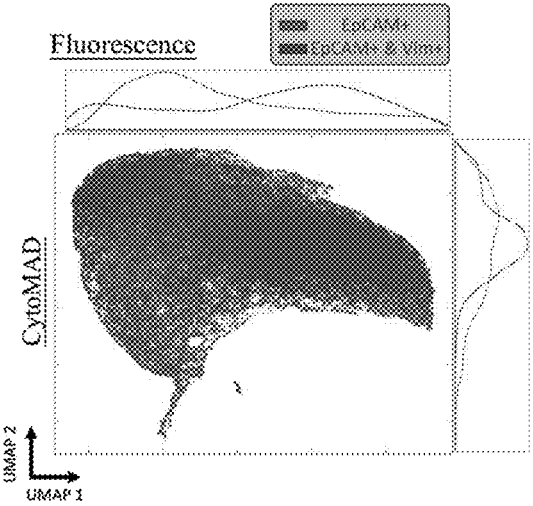
Figure 16B:
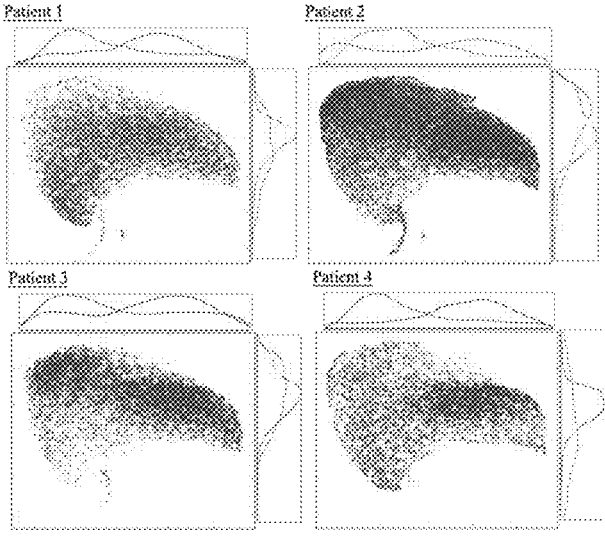

The capability of label-free imaging in characterizing clinical samples through molecular marker prediction is assessed, involving UMAP analysis based on molecular marker staining (FIG. 12C and FIGS. 16A-16B). The distinctive clustering and non-complete overlap between EpCAM+ and Both+ populations suggest the existence of significant biophysical variations among these groups.

A deep neural network is trained based on CytoMAD-profiles to classify between cancer-suspected cells (Ep-CAM+) and EMP cells (Both+). In a simulated real-world application, the model's performance is evaluated through an across-patient classification test, training the classifier on one patient's data and testing it on the remaining three patients (FIG. 12C). The performance of this across-patient molecular marker prediction is assessed using receiver operating characteristic (ROC) curves, yielding a notable increase in the area under the curve (AUC) from 0.7808 to 0.9445 (with 1.00 indicating ideal performance) after the implementation of CytoMAD. The predicted population ratio of EpCAM+ to Both+ cells further demonstrates the model's across-patient classification capabilities. This enhancement achieved by CytoMAD underscores the potential of label-free imaging cytometry in clinical research, especially when biological markers and prior knowledge are limited.

Figure 12D:
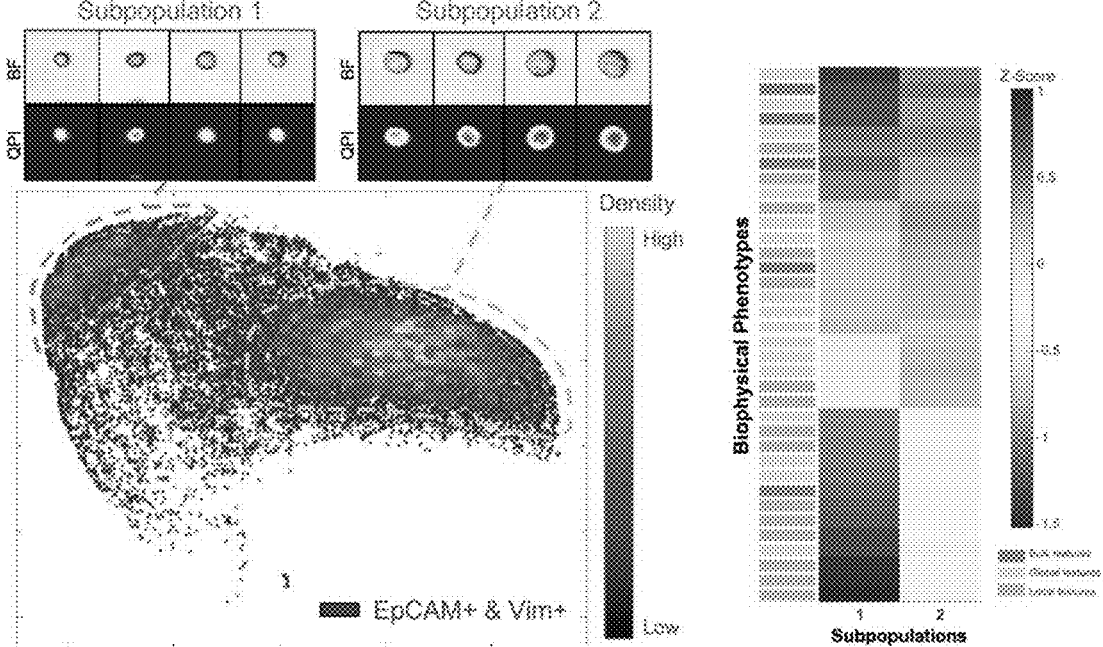

A UMAP analysis of EMP cells (Both+) reveals two distinct clusters (see FIG. 12D), hinting at the presence of two subpopulations within EMP cells. Further analysis of these subpopulations highlights that subpopulation 1 consists of cells with smaller sizes, while subpopulation 2 comprises larger cells. To quantitatively investigate these differences, 84 hand-crafted biophysical phenotypes are extracted, and the z-scores of each subpopulation are computed for each phenotype. These phenotypes are grouped into three categories (bulk, global texture, and local texture of biophysical morphology), with only phenotypes exhibiting significant z-score differences between the two subpopulations (greater than the mean z-score difference) being presented. The profile of z-score differences underscores substantial disparities in biophysical phenotypes between the two EMP cell subpopulations, particularly concerning global texture. The identification of these subpopulations and the biophysical phenotype variations within them underscore the potential of label-free biophysical imaging, coupled with CytoMAD, in unraveling cell heterogeneity, particularly in scenarios with limited biological markers and prior knowledge.

In summary, CytoMAD introduces a groundbreaking generative and integrative deep-learning approach that adeptly mitigates batch effects in image-based cytometry while simultaneously enabling image contrast translation to reveal additional cellular insights and self-supervised morphological profiling. This highlights its pertinence in the burgeoning realm of biophysical cytometry, where CytoMAD enhances bright-field image data to yield quantitative biophysical phenotypes, including cell mass, mass density, and their subcellular local and global distributions. This innovation holds significant potential to simplify the complexities of conventional quantitative phase imaging techniques, such as interferometric and holographic modules, and contribute to wider adoption of biophysical cytometry across diverse applications. The study's demonstrations encompass accurate label-free classification of human lung cell types and subtypes, functional drug-treatment assays, and biophysical cellular analysis of early-stage NSCLC tumor biopsies.

While the promising outcomes of CytoMAD are evident, numerous avenues for further development emerge. For instance, the cross-modality image translation/augmentation concept could extend beyond contrast translation to encompass fluorescence image contrast, such as bright-field to fluorescence (S. Cheng et al., Science Advances, 2021) (E. M. Christiansen et al., Cell, 2018) (C. Ounkomol et al., Nature Methods, 2018), QPI to fluorescence (S-M Guo et al., eLife, 2020) (Y. Jo et al., Nature Cell Biology, 2021) (M. E. Kandel et al., Nature Communications, 2020), or fluorescence to colorized bright-field (Y. Rivenson et al., Nature Biomedical Engineering, 2019) (Y. Zhang et al., Advanced Science, 2022). This extension may aid in establishing connections between molecular specificity and label-free morphological phenotypes of cells and tissues. Furthermore, enhancing the interpretability of CytoMAD's morphological profiles could provide more intuitive insights into underlying biological mechanisms. Strategies might involve integrating feature attribution methods, such as Layer-wise Relevance Propagation (LRP) or Gradient-weighted Class Activation Mapping (Grad-CAM), to visualize influential regions within input images and improve model interpretability. Additionally, incorporating disentangled learning techniques within the autoencoder architecture may lead to more interpretable and independent features that better align with underlying biological processes.

As seen from the above examples, CytoMAD performs deep-learning-driven, batch-aware morphological profiling of cells. Its application in biophysical cytometry demonstrates its ability to accomplish accurate and insightful investigations into complex biological phenomena. As such, it can be applied to research into cellular functions and discovery of cost-effective biomarkers for diagnostic and therapeutic purposes.

While batch effects have been extensively studied in other single-cell data modalities, such as single-cell omics, their impact on cell imaging remains relatively unexplored, with only a few exceptions. CytoMAD's use of self-supervised learning permits it to address batch variations while facilitating cross-modality image translation. This enables robust integrative image-based analysis across batches, without requiring prior assumptions about complex data distributions or extensive manual annotation. CytoMAD provides accurate quantitative phase imaging from bright-field images as well as providing self-supervised batch-corrected morphological profiling for downstream analysis. Remarkably, even without prior annotations, CytoMAD accurately predicts progressive morphological changes linked to drug concentration trends. By utilizing blood and tumor classification as pretext tasks, CytoMAD successfully corrects batch effects and predicts label-free morphologies correlated with EpCAM and vimentin phenotypes in NSCLC biopsies.

Figure 18:
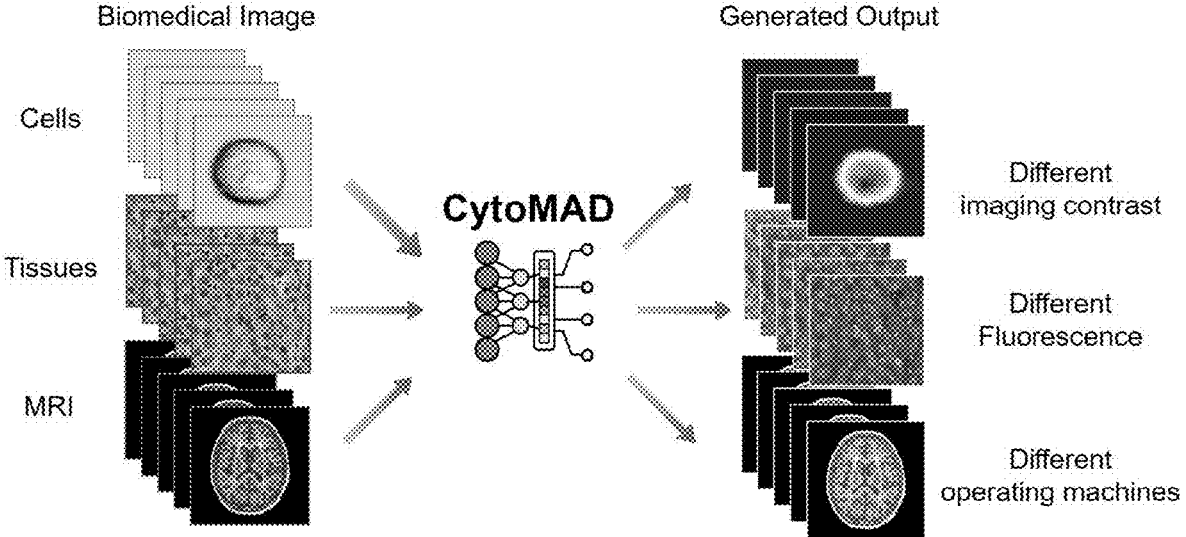
FIG. 18 illustrates the prospective utility of CytoMAD in correcting batch effect across diverse biological image categories (including but not limited to cellular images, tissue images and magnetic resonance imaging (MRI)) and its potential for image contrast translation across distinct imaging modalities (including but not limited to between different imaging contrast, difference fluorescence and different operating imaging machines)
Figure 19:
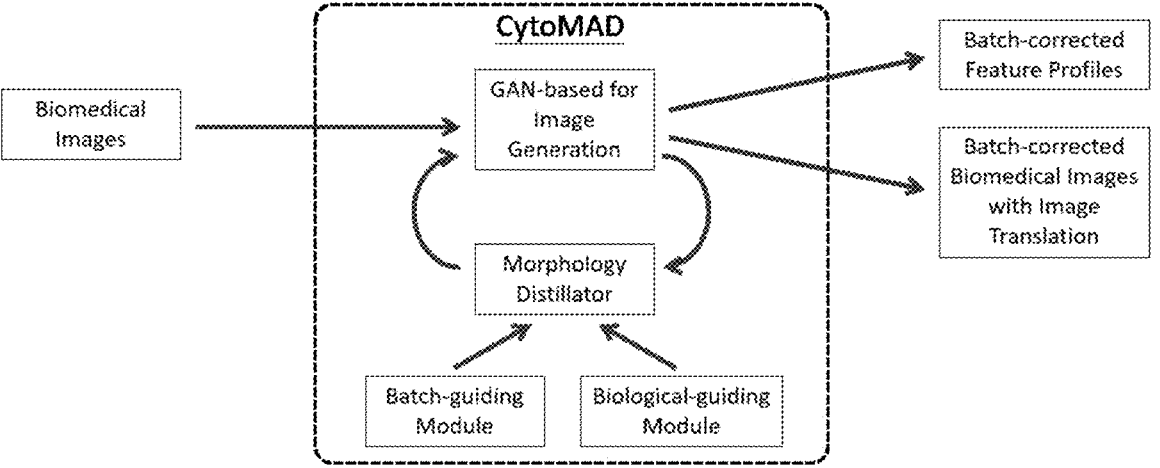
FIG. 19 depict a simplified flowchart of CytoMAD in accordance with one embodiment of the present invention.

The foregoing description of the present invention has been provided for the purposes of illustration and description. It is not intended to be exhaustive or to limit the invention to the precise forms disclosed. CytoMAD targets diverse biological images and conducts batch effect correction through the batch-guiding model and biological-guiding module within the morphology distillator, as illustrated in the simplified flowchart in FIG. 19. It is anticipated to exhibit efficacy in addressing batch effects across diverse biological image categories with promising image contrast translation across distinct imaging modalities (FIG. 18). Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A system for correcting batch effects by removing systematic variations in biological images from equipment, reagents, sample preparation, or imaging conditions and extracting phenotypic features in biological images, comprising:

a deep-learning generative adversarial network model trained to determine an underlying structure of an input image and remove image artifacts, wherein the deep-learning generative adversarial network model comprises an autoencoder architecture for:

extracting morphological features of the input image;

reconstructing an output image; and pretraining components of the deep-learning generative adversarial network model for image reconstruction;

a discriminator that classifies the output image by comparing it with the input image for identifying and rectifying residual batch-related variations, serving as a part of a concurrent refinement cycle to achieve accurate image reconstruction and contrast conversion; and a morphology distillator comprising a batch classifier and a cell type/state classifier for recognizing phenotypic features and batch variations and removing the batch variations in the output image through a feedback mechanism in the concurrent refinement cycle, wherein the batch classifier employs domain adaptation to mitigate the influence of batch effects while retaining biologically significant cellular information identified by the cell type/state classifier;

wherein the deep-learning generative adversarial network model is retrained by the concurrent refinement cycle with parameters of the batch classifier and the cell-type/state classifier being frozen during batch effect correction; and wherein the frozen parameters of the batch classifier and the cell-type/state classifier are used to update parameters of the autoencoder architecture and the discriminator, thereby guiding the batch effect correction while preserving the biologically significant cellular information and ensuring image prediction accuracy.

2. The system of claim 1, wherein the batch classifier and the cell type/state classifier are pretrained by the autoencoder to identify batch and cell information.

3. The system of claim 1, wherein the deep-learning generative adversarial network model can be optionally pretrained with an image contrast translation functionality, so as to perform an image contrast conversion for providing an augmented output image.

4. The system of claim 1, wherein the morphology distillator is integrated into a bottleneck region and the output layer of the deep-learning generative adversarial network model, establishing a feedback loop to separate the phenotypic features and batch variations.

5. The system of claim 1, wherein the cell type/state classifier within the morphology distillator employs a self-supervised learning mechanism to capture and distinguish cellular phenotypes to provide automated cellular classification.

6. The system of claim 1, wherein the batch distillation potency of the deep-learning generative adversarial network model can be elevated by a process of segmenting the batch classifier within the morphology distillator at a bottleneck stage into multiple miniature classifiers, and/or a process of periodic retraining at a predetermined interval.

7. The system of claim 1, wherein the discriminator employs a convolutional neural network to assess and guide the contrast adjustment process for translation of image contrast.

8. The system of claim 1, wherein the morphology distillator incorporates a self-attention mechanism to selectively focus on informative regions within the input image, to extract phenotypic features from the input image.

9. The system of claim 1, wherein the training to determine an underlying structure of an input image and remove image artifacts includes training on diverse and heterogeneous biological datasets to learn different imaging modalities, cell types, and experimental conditions.

10. The system of claim 1, wherein the system is implemented in a cloud-based platform for remote access to batch correction and phenotypic feature extraction.

* * * * *